United States Patent
Okabe

(10) Patent No.: US 9,558,364 B2
(45) Date of Patent: Jan. 31, 2017

(54) COMPUTING MACHINE, ACCESS MANAGEMENT METHOD, AND ACCESS MANAGEMENT PROGRAM

(75) Inventor: Ryo Okabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/371,891

(22) PCT Filed: Feb. 23, 2012

(86) PCT No.: PCT/JP2012/054427
§ 371 (c)(1),
(2), (4) Date: Jul. 11, 2014

(87) PCT Pub. No.: WO2013/125012
PCT Pub. Date: Aug. 29, 2013

(65) Prior Publication Data
US 2015/0302222 A1    Oct. 22, 2015

(51) Int. Cl.
G06F 7/04      (2006.01)
G06F 21/62    (2013.01)
(Continued)

(52) U.S. Cl.
CPC ....... *G06F 21/6218* (2013.01); *G06F 9/45558* (2013.01); *G06F 9/5011* (2013.01); *G06F 9/5077* (2013.01); *G06F 9/52* (2013.01); *G06F 2009/45579* (2013.01); *G06F 2009/45587* (2013.01)

(58) Field of Classification Search
CPC ...... H04L 63/08; G06F 21/6218; G06F 21/10; G06F 21/31; G06F 9/4401; G06F 9/441; G06F 9/4406; G11B 20/00086
See application file for complete search history.

(56) References Cited

U.S. PATENT DOCUMENTS 5,694,619 A    12/1997  Konno
5,925,111 A     7/1999  Nagasawa
(Continued)

FOREIGN PATENT DOCUMENTS

EP    0 574 691 A1    12/1993
JP       60 86657     5/1985
(Continued)

OTHER PUBLICATIONS

Office Action issued Jul. 7, 2015 in Japanese Patent Application No. 2014-500820 (with partial English translation).
(Continued)

*Primary Examiner* — Mohammad W Reza
*Assistant Examiner* — Carlton Johnson
(74) *Attorney, Agent, or Firm* — Oblon, McClelland, Maier & Neustadt, L.L.P.

(57) ABSTRACT

When an access occurs to an I/O device from an OS 231*a*, an I/O allocation unit refers to an I/O allocation table, and determines whether the I/O device is allocated to other OS 231*b*. When the I/O device is allocated to another OS 231*b*, a control unit notifies the OS 231*a* of an error. When the I/O device is not allocated to either of the OSs 231*a-b*, the I/O allocation unit updates the I/O allocation table in order to allocate the I/O device to the OS 231*a*, and an I/O emulation unit emulates the access to the I/O device.

8 Claims, 18 Drawing Sheets

(51) Int. Cl.
  *G06F 9/50* (2006.01)
  *G06F 9/52* (2006.01)
  *G06F 9/455* (2006.01)

(56) References Cited

U.S. PATENT DOCUMENTS

| | | | |
|---|---|---|---|
| 6,338,101 | B1 | 1/2002 | Kakimi |
| 2002/0069335 | A1 | 6/2002 | Flylnn, Jr. |
| 2002/0152334 | A1 | 10/2002 | Holm et al. |
| 2006/0248526 | A1 | 11/2006 | Rostampour |
| 2007/0078891 | A1* | 4/2007 | Lescouet ............... G06F 9/4881 |
| 2007/0180454 | A1 | 8/2007 | Fujimoto et al. |
| 2008/0155222 | A1 | 6/2008 | Hasegawa |
| 2008/0307124 | A1 | 12/2008 | Fujimoto et al. |
| 2008/0307440 | A1 | 12/2008 | Fujimoto et al. |
| 2008/0313654 | A1 | 12/2008 | Fujimoto et al. |
| 2009/0228882 | A1* | 9/2009 | Wang .................... G06F 9/5077 718/1 |
| 2010/0138208 | A1 | 6/2010 | Hattori et al. |
| 2010/0146620 | A1 | 6/2010 | Simeral et al. |
| 2010/0153947 | A1 | 6/2010 | Haruma |
| 2011/0179418 | A1 | 7/2011 | Takebe et al. |
| 2011/0246755 | A1* | 10/2011 | Patnaik ................ G06F 9/4416 713/2 |
| 2012/0304285 | A1 | 11/2012 | Simeral et al. |

FOREIGN PATENT DOCUMENTS

| | | |
|---|---|---|
| JP | 7 84936 | 3/1995 |
| JP | 10-83373 A | 3/1998 |
| JP | 2006 309754 | 11/2006 |
| JP | 2007 220086 | 8/2007 |
| JP | 2008 158710 | 7/2008 |
| JP | 2010 128911 | 6/2010 |
| JP | 2010 128943 | 6/2010 |
| JP | 2010-186456 | 8/2010 |
| JP | 2010 186465 | 8/2010 |
| KR | 10-2010-0066405 | 6/2010 |

OTHER PUBLICATIONS

Office Action issued Apr. 22, 2015 in Korean Patent Application No. 10-2014-7023181 (with partial English translation).

Office Action mailed Mar. 28, 2016, in Chinese Patent Application No. 201280070396.6 (with partial English-language translation).

Search Report mailed May 6, 2016, in European Patent Application No. 12869300.9.

Office Action mailed Sep. 19, 2016, in Chinese Patent Application No. 201280070396.6 (with English-language translation).

* cited by examiner

Fig.4

| DEVICE IDENTIFIER | ALLOCATION DESTINATION | AREA0 | | | AREA1 | | | ... | AREA5 | | |
|---|---|---|---|---|---|---|---|---|---|---|---|
| | | BASE ADDRESS | SIZE | ATTRIBUTE | BASE ADDRESS | SIZE | ATTRIBUTE | ... | BASE ADDRESS | SIZE | ATTRIBUTE |
| ... | ... | ... | ... | ... | ... | ... | ... | ... | ... | ... | ... |

229 : I/O ALLOCATION TABLE

Fig.6

229 : I/O ALLOCATION TABLE

| DEVICE IDENTIFIER | ALLOCATION DESTINATION | AREA0 | | | AREA1 | | | ... | AREA5 | | |
|---|---|---|---|---|---|---|---|---|---|---|---|
| | | BASE ADDRESS | SIZE | ATTRIBUTE | BASE ADDRESS | SIZE | ATTRIBUTE | ... | BASE ADDRESS | SIZE | ATTRIBUTE |
| ... | ... | ... | ... | ... | ... | ... | ... | ... | ... | ... | ... |
| 110a | NULL | a8000000 | 8M | MEMORY | (UNUSED) | | | ... | (UNUSED) | | |
| 110b | NULL | ffc21000 | 128 | REGISTER | a8800000 | 4K | MEMORY | ... | (UNUSED) | | |
| 110c | NULL | a8801000 | 4K | MEMORY | (UNUSED) | | | ... | (UNUSED) | | |
| ... | ... | ... | ... | ... | ... | ... | ... | ... | ... | ... | ... |

Fig. 8

| DEVICE IDENTIFIER | ALLOCATION DESTINATION | AREA0 ||| ... | AREA1 ||| ... | AREA5 |||
|---|---|---|---|---|---|---|---|---|---|---|---|---|
| | | BASE ADDRESS | SIZE | ATTRIBUTE | | BASE ADDRESS | SIZE | ATTRIBUTE | | BASE ADDRESS | SIZE | ATTRIBUTE |
| ... | ... | ... | ... | ... | ... | ... | ... | ... | ... | ... | ... | ... |
| 110a | 231a | a8000000 | 8M | MEMORY | ... | (UNUSED) ||| ... | (UNUSED) ||| 
| 110b | 231b | ffc21080 | 128 | REGISTER | ... | a8800000 | 4K | MEMORY | ... | (UNUSED) |||
| 110c | NULL | a8801000 | 4K | MEMORY | ... | (UNUSED) ||| ... | (UNUSED) |||
| ... | ... | ... | ... | ... | ... | ... | ... | ... | ... | ... | ... | ... |

229: I/O ALLOCATION TABLE

Fig.12

229 : I/O ALLOCATION TABLE

| DEVICE IDENTIFIER | ALLOCATION DESTINATION | DEVICE TYPE | AREA0 ||| AREA1 ||| ... | AREA5 |||
|---|---|---|---|---|---|---|---|---|---|---|---|---|
| | | | BASE ADDRESS | SIZE | ATTRIBUTE | BASE ADDRESS | SIZE | ATTRIBUTE | | BASE ADDRESS | SIZE | ATTRIBUTE |
| ... | ... | ... | ... | ... | ... | ... | ... | ... | ... | ... | ... | ... |
| 110a | 231a | — | a8000000 | 8M | MEMORY | (UNUSED) | | | ... | (UNUSED) | | |
| 110b | 231b | — | ffc21080 | 128 | REGISTER | a8800000 | 4K | MEMORY | ... | (UNUSED) | | |
| 110c | NULL | BRIDGE | a8801000 | 4K | MEMORY | (UNUSED) | | | ... | (UNUSED) | | |
| ... | ... | ... | ... | ... | ... | ... | ... | ... | ... | ... | ... | ... |

COMPUTING MACHINE, ACCESS MANAGEMENT METHOD, AND ACCESS MANAGEMENT PROGRAM

TECHNICAL FIELD

The present invention relates to, for example, a computing machine, an access management method, and an access management program that manage access to a device from a plurality of OSs (Operating Systems).

BACKGROUND ART

A virtual machine system is a system that enables a plurality of OSs to operate. For example, there exist virtual machine systems, such as Xen® and KVM (Kernel-based Virtual Machine)®.

In a conventional virtual machine system, a plurality of OSs are booted after previously setting I/O devices to be occupied by each of the plurality of OSs. Then, a virtual machine monitor (VMM) allows access from each OS to a memory or a register of the I/O device which is occupied by the OS concerned, and denies access from each OS to a memory or a register of the I/O device which is occupied by other OS. When an I/O device is a PCI device (including a PCI Express device, which applies hereinafter), the virtual machine monitor allows or denies access to a PCI configuration register. Thus, exclusive allocation of an I/O device to each OS has been performed.

For example, in Xen, I/O devices to be occupied by an OS are specified in a configuration file, and in KVM, I/O devices to be occupied by an OS are specified in a start option of the OS.

In the conventional virtual machine system, such as Xen or KVM, it is necessary to previously set I/O devices to be occupied by each OS. Therefore, in the case where multiple OSs are operating and each OS occupies multiple I/O devices, the previous setting becomes complicated.

Patent Literature 1 discloses a virtual machine system that switches an OS occupying an I/O device, during execution by the way described below.

In the virtual machine system of Patent Literature 1, a VMM gives an I/O device occupancy permission to an OS, based on a factor such as an I/O device occupancy request from the OS or an event detection by the VMM. Then, the OS performs input/output to/from the I/O device only when obtaining the I/O device occupancy permission. Accordingly, it is not necessary to previously set the I/O device to be occupied by one of the OSs.

However, since a memory and a register of the I/O device are not protected, an OS which is not occupying the I/O device can access the memory and the register of the I/O device concerned. Therefore, there is a possibility that contents of a memory and a register of an I/O device being occupied by a certain OS may be destroyed by other OS.

CITATION LIST

Patent Literature

Patent Literature 1: JP 2007-220086 A

SUMMARY OF INVENTION

Technical Problem

The present invention aims, for example, to enable properly managing access to devices from a plurality of OSs.

Solution to Problem

In a computing machine according to the present invention, a plurality of OSs (Operating Systems) each access a device operate.

The computing machine includes:

a device allocation storage unit configured to store a device allocation table to relate the device to an OS to which the device is allocated; and an access management unit configured, when an access to the device occurs, to determine an OS to which the device is allocated, based on the device allocation table, when the device is not allocated to any OS, to update the device allocation table in order to relate the device to the OS being an accessing party and to allow the access to the device, and when the device is allocated to an OS other than the OS being the accessing party, to deny the access to the device.

Advantageous Effects of Invention

According to the present invention, for example, it is possible to properly manage access to devices from a plurality of OSs.

BRIEF DESCRIPTION OF DRAWINGS

FIG. 4 shows an initial state of an I/O allocation table 229 according to the first embodiment;

FIG. 6 shows the I/O allocation table 229 after initialization processing according to the first embodiment;

FIG. 8 shows the I/O allocation table 229 after allocating I/O devices 110 a-b according to the first embodiment;

FIG. 12 shows the I/O allocation table 229 according to a second embodiment;

DESCRIPTION OF EMBODIMENTS

First Embodiment

There will be described a virtual machine system that allocates a device to an OS (Operating System) of a virtual machine so as to make the OS occupy the device. The virtual machine system is an example of a system in which a plurality of OSs operate.

Figure 1:
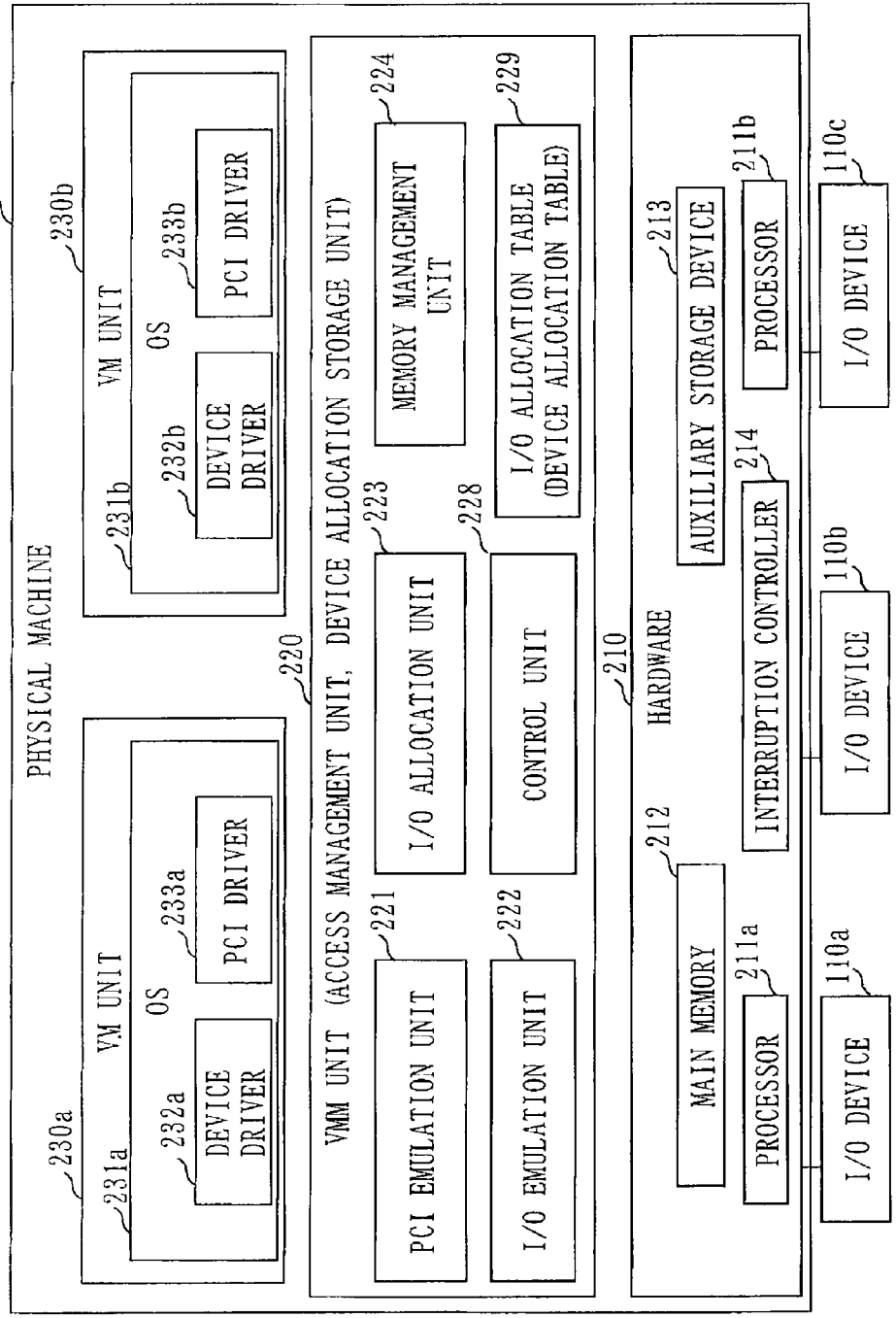
FIG. 1 is a configuration diagram of a virtual machine system 100 according to a first embodiment.

FIG. 1 is a configuration diagram of a virtual machine system 100 according to a first embodiment.

The hardware configuration and functional configuration of the virtual machine system 100 of the first embodiment will be described based on FIG. 1.

The virtual machine system 100 includes a physical machine 200 and a plurality of I/O devices 110a-c (Input/Output devices) connected to the physical machine 200. The number of the I/O devices 110 may also be two, or four or more.

In Embodiments, description will be performed on the supposition that the I/O devices 110a-c are PCI devices using PCI (Peripheral Components Interconnect) buses as an interface. However, the I/O devices connected to the physical machine 200 may also be devices other than PCI devices.

A PCI device stores a PCI configuration register including a BAR (Base Address Register). The BAR of the PCI configuration register indicates the base address (head address) and the size of the memory space or the register space (both of them being storage areas) allocated to the PCI device.

A display device, a keyboard, a mouse, a printer, a communication board, an external storage device and the like are examples of the I/O device 110.

The physical machine 200 (an example of a computing machine or a computer) is a computer including hardware 210, such as processors 211a-b, a main memory 212, an auxiliary storage device 213, and an interruption controller 214.

The processors 211a-b are processing devices that control the physical machine 200, and a CPU (Central Processing Unit) is an example of the processor 211 a or b. The number of processors 211 may also be one, or three or more.

The main memory 212 is a storage device, also referred to as a primary storage device, and a RAM (Random Access Memory) and a ROM (Read Only Memory) are examples of the main memory 212.

The auxiliary storage device 213 is a storage device, also referred to as a secondary storage device, and a magnetic disk drive and a flash memory are examples of the auxiliary storage device 213.

The interruption controller 214 is a device that controls interruptions from the I/O devices 110a-c. For example, the interruption controller 214 notifies the processors 211a-b of an interruption from the I/O devices 110a-c.

The physical machine 200 further includes a VMM unit 220 and a plurality of VM units 230a-b that operate using the hardware 210. The number of the VM units 230 may also be three or more.

The VM unit 230a, which executes an OS 231a, a device driver 232a, and a PCI driver 233a, operates as a virtual machine (VM). Similarly, the VM unit 230b, which executes an OS 231b, a device driver 232b, and a PCI driver 233b, operates as a virtual machine. The virtual machine is a computing machine virtually constructed by a virtual machine monitor (VMM) to be described later. The VM unit 230a shall be operated using the processor 211a, and the VM unit 230b shall be operated using the processor 211b.

The OSs 231a-b are OSs of the virtual machine, (or execution units for executing the OSs of the virtual machine). The OSs 231a-b each do not support a virtual address space. The OSs 231a-b each operate with a single processor or a multiprocessor. In Embodiments, the OSs 231a-b each operated by a single processor will be described as an example. However, the OSs 231a-b may also be OSs each operated by a multiprocessor. Moreover, the OSs 231a-b each operate recognizing a virtual address space constructed by a memory management unit 224, as a physical address space.

The device drivers 232a-b are software (or execution units for executing software) for accessing memories and registers of the I/O devices 110a-c and individually controlling the I/O devices 110a-c. "Access" mainly indicates to read data or to write data, (which applies hereinafter).

The PCI drivers 233a-b are software (or execution units for executing software) for accessing PCI configuration registers of the I/O devices 110a-c.

The VMM unit 220 (an example of a device allocation storage unit or an access management unit) executes a virtual machine monitor (VMM) so as to control a plurality of virtual machines (VM units 230a-b). The virtual machine monitor is software for allocating hardware resources (e.g., the processor 211 and a storage area of the main memory 212) to each virtual machine in order to construct a plurality of virtual machines.

The VMM unit 220 includes a PCI emulation unit 221, an I/O emulation unit 222, an I/O allocation unit 223, the memory management unit 224, and a control unit 228.

The PCI emulation unit 221 emulates access to the PCI configuration register from the PCI drivers 233a or b. That is, the PCI emulation unit 221 intercepts access to the PCI configuration register, and accesses the PCI configuration register, instead of the PCI driver 233a or b.

The I/O emulation unit 222 emulates access to the memory or the register of the I/O device from the device driver 232a or b. That is, the I/O emulation unit 222 intercepts access to the memory or the register of the I/O device, and accesses the memory or the register of the I/O device, instead of the device driver 232a or b.

The I/O allocation unit 223 refers to an I/O allocation table 229 to be described later, determines the OS 231 which is allocated to the I/O device 110 being an accessed party, and updates the I/O allocation table 229.

The memory management unit 224 defines virtual address spaces for the VM units 230a-b (the OSs 231a-b). For example, the memory management unit 224 generates a mapping table that correspondingly relates a virtual address indicating a storage area in a virtual address space to a physical address indicating a storage area in a physical address space. That is, the memory management unit 224 performs mapping between a virtual address space and a physical address space by using the mapping table. "Mapping" mainly indicates to correspondingly relate a virtual address of a virtual address space to a physical address of a physical address space, (which applies hereinafter).

The control unit 228 performs controlling of the VM units 230a-b, and initialization of the I/O allocation table 229 to be described later.

Figure 2:
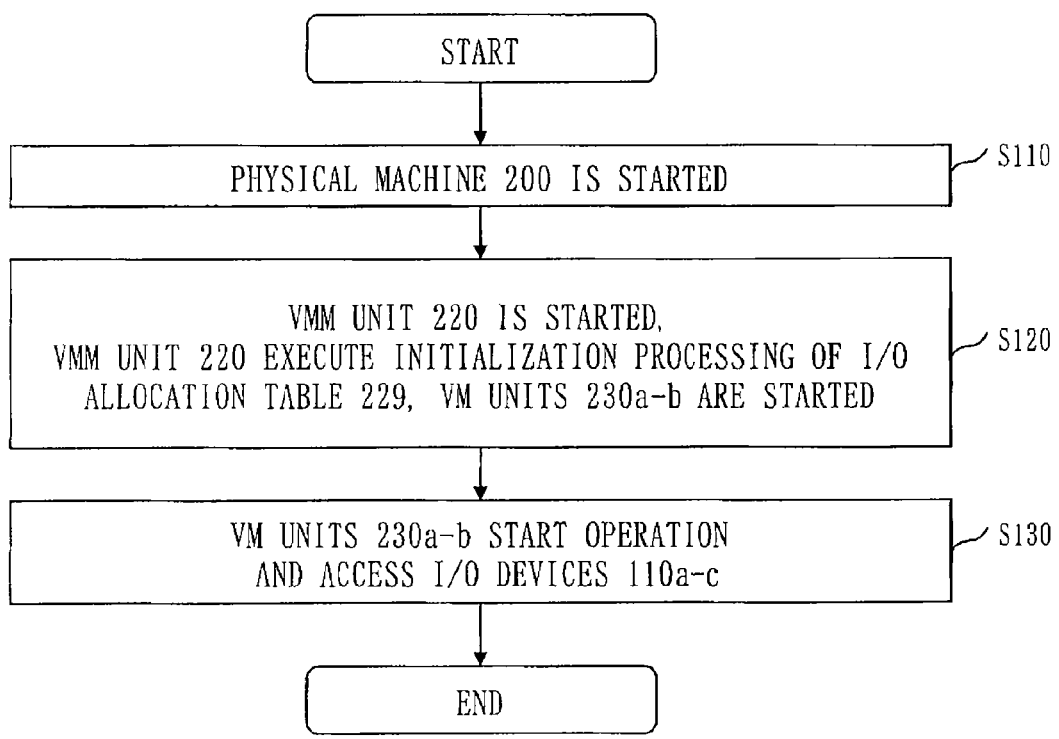
FIG. 2 is a flowchart showing operations of the virtual machine system 100 according to the first embodiment.

FIG. 2 is a flowchart showing operations of the virtual machine system 100 according to the first embodiment.

Operations of the virtual machine system 100 of the first embodiment will be described based on FIG. 2.

In S110, the physical machine 200 is started. When the physical machine 200 is started, a start processing unit (not shown) of the physical machine 200 executes predetermined software, such as a BIOS (Basic Input/Output System) and a boot loader (Start processing of the physical machine 200).

For example, initial setting of a physical address space and initial setting of a PCI configuration register are performed in the start processing of the physical machine 200.

Figure 3:
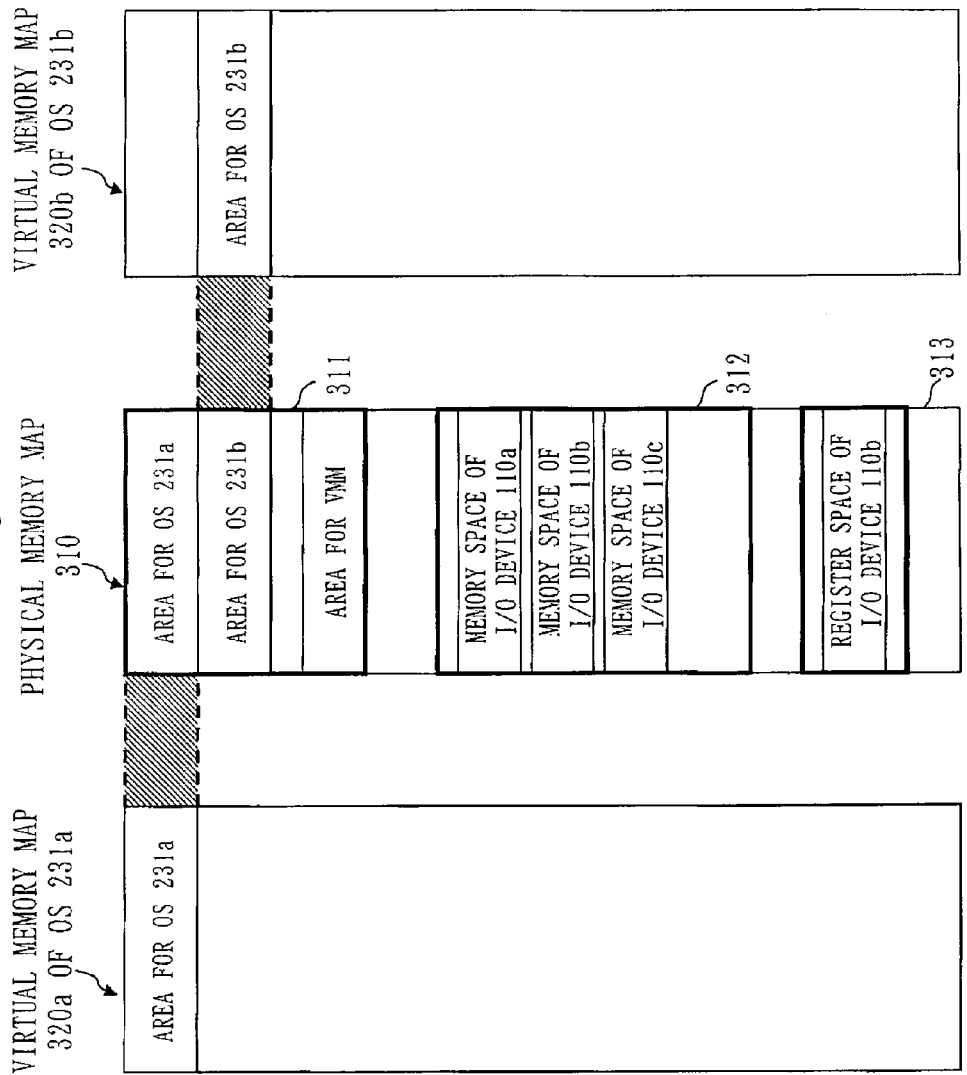
FIG. 3 shows a memory map of the virtual machine system 100 according to the first embodiment.

FIG. 3 shows a memory map of the virtual machine system 100 according to the first embodiment.

The memory map of the virtual machine system 100 of the first embodiment will be described based on FIG. 3.

Data of a physical memory map 310 is stored and managed by the processor 211 and the main memory 212.

A memory space 311 for VM, a memory space 312 for I/O, a register space 313 for I/O, etc. are reserved in a physical address space. The memory space 311 for VM is a storage area to be allocated to the VMM and the OS 231. The memory space 312 for I/O is a storage area to be allocated to the memories of the I/O devices 110a-c. The register space 313 for I/O is a storage area to be allocated to the registers of the I/O devices 110a-c.

In the start processing (S110 of FIG. 2) of the physical machine 200, initial setting of a physical address space is performed as described below.

The memory space 311 for VM, the memory space 312 for I/O, the register space 313 for I/O, etc. are reserved in a physical address space.

The storage area for the VMM unit 220 is reserved in the memory space 311 for VM, and programs and data of the VMM are loaded (read) into the storage area for the VMM unit 220 from the auxiliary storage device 213. The I/O allocation table 229 to be described later is an example of data loaded to the storage area for the VMM unit 220.

Respective memory spaces of the I/O devices 110a-c are reserved in the memory space 312 for I/O. It is possible to access memories of the I/O devices 110a-c by accessing memory spaces of the I/O devices 110a-c.

Respective register spaces of the I/O devices 110a-c are reserved in the register space 313 for I/O (FIG. 3 shows only the register space of the I/O device 110b). It is possible to access registers of the I/O devices 110a-c by accessing the register spaces of the I/O devices 110a-c.

A virtual memory map 320a is a figure or data showing a use of the virtual address space for the OS 231a, and a virtual memory map 320b is a figure or data showing a use of the virtual address space for the OS 231b. Data of the virtual memory maps 320a-b is stored and managed by the memory management unit 224 of the VMM unit 220. The virtual address spaces for the OSs 231a-b will be described later.

FIG. 4 shows an initial state of the I/O allocation table 229 according to the first embodiment.

The I/O allocation table 229 of the first embodiment will be described based on FIG. 4.

The I/O allocation table 229 (an example of a device allocation table) is data for correspondingly relating the I/O device 110 (its memory and register) to the OS 231 to which the I/O device 110 is allocated.

The I/O allocation table 229 includes "device identifier", "allocation destination", and "area (0 to 5)". The storage area indicated by "area n (n being 0 to 5)" corresponds to a storage area indicated by BARn of the PCI configuration register. Instead of showing a 32-bit storage area by using one "area n", it is also preferable to show a 64-bit storage area by using two "areas n" similarly to the BAR of the PCI configuration register.

The "area (0 to 5)" includes "base address", "size", and "attribute". When in an initial state, none of the items are set. Moreover, other information (e.g., a prefetchable or non-prefetchable flag) may also be included in the "area (0-5)".

Each of the items to be set later functions as described below.

"Device identifier" indicates an identifier of the I/O device 110. For example, in the case of a PCI device, a group of a domain number, a bus number, a device number, and a function number is used as a device identifier.

"Allocation destination" indicates an identifier of the OS 231 to which the I/O device 110 is allocated. "NULL" to be set in the "allocation destination" indicates that the I/O device 110 is not allocated to any OS 231.

"Base address" indicates the head physical address of a storage area allocated for I/O device 110. With respect to "base address" of "area n (n being 0 to 5)", a base address indicated by BARn of a PCI configuration register is set.

"Size" indicates the size of a storage area allocated. With respect to "size" of "area n", a size indicated by BARn of a PCI configuration register is set.

"Attribute" indicates a use of a storage area allocated. "Memory" to be set in "attribute" indicates that the storage area allocated is a memory space, and "register" to be set in "attribute" indicates that the storage area allocated is a register space.

Returning to FIG. 2, description of operations of the virtual machine system 100 is continued.

In S120, the VMM unit 220 is started. When the VMM unit 220 is started, the control unit 228 of the VMM unit 220 performs initialization processing of the I/O allocation table 229 (refer to FIG. 4). The Initialization processing of the I/O allocation table 229 will be described later.

Furthermore, the control unit 228 of the VMM unit 220 reserves storage areas for the OSs 231a-b in the memory space 311 for VM (refer to FIG. 3), and loads (reads) programs and data of the VM into storage areas for the OSs 231a-b from the auxiliary storage device 213. The OSs 231a-b, the device drivers 232a-b, and the PCI drivers 233a-b are examples of programs loaded to the storage areas for the OSs 231a-b. It is also preferable to perform reserving storage areas for the OSs 231a-b and loading programs and data of the VM, in the start processing (S110) of the physical machine 200.

The memory management unit 224 of the VMM unit 220 defines virtual address spaces for the OSs 231a-b, and performs mapping of the storage areas for the OSs 231a-b to the virtual address spaces (refer to virtual memory maps 320 a-b of FIG. 3). At this time, the memory management unit 224 generates a mapping table that correspondingly relate a physical address of a physical address space to a virtual address of a virtual address space.

Then, the control unit 228 of the VMM unit 220 starts the VM units 230a-b.

In S130, the VM units 230a-b start operating. When operations of the VM units 230a-b are started, there occur access to memories or registers of the I/O devices 110a-c and access to PCI configuration registers. Processing in the case of access occurrence will be described later.

The VM units 230a-b start operating in the physical machine 200, by the operation of the virtual machine system 100 as shown in the flowchart of FIG. 2.

Figure 5:
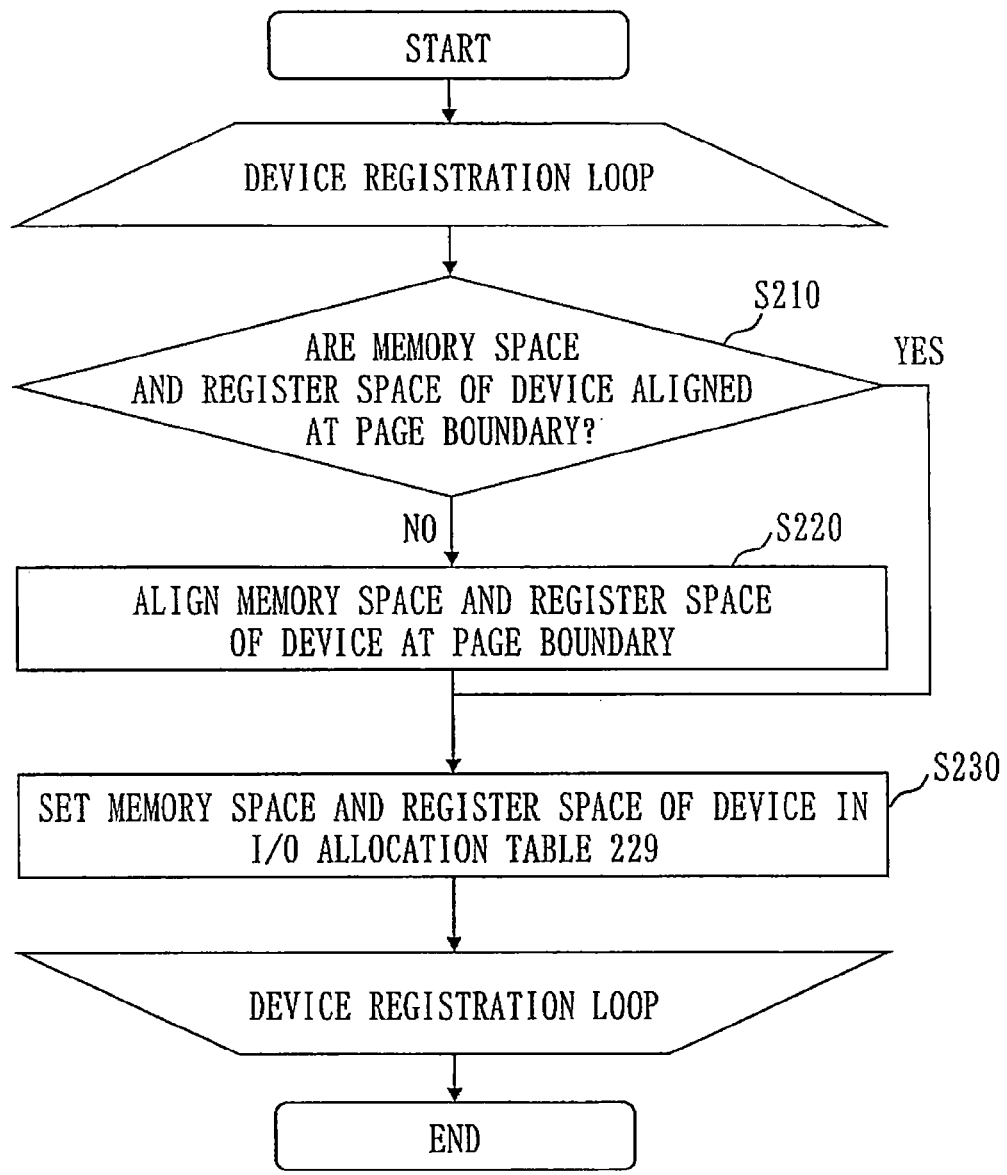
FIG. 5 is a flowchart showing initialization processing of the I/O allocation table 229 according to the first embodiment.

FIG. 5 is a flowchart showing initialization processing of the I/O allocation table 229 according to the first embodiment.

Initialization processing of the I/O allocation table 229 of the first embodiment will be described based on FIG. 5.

The control unit 228 of the VMM unit 220 performs processing from S210 to S230 for respective I/O devices 110 used by the physical machine 200. That is, the control unit 228 performs processing from S210 to S230 for each of the I/O devices 110a-c.

In S210, the control unit 228 determines whether the memory space and the register space of the I/O device 110 are aligned at the page boundary.

At this time, the control unit 228 refers to each BAR in the PCI configuration register of the I/O device 110. The base address and the size of the memory space or the register space of the I/O device 110 have been set in each BAR. The control unit 228 determines whether the base address which has been set in each BAR is the address (address per unit of page size (e.g., 4 K bytes)) of the page boundary. When the base address which has been set in each BAR is the address of the page boundary, the memory space and the register space of the I/O device 110 are aligned at the page boundary.

When the memory space and the register space of the I/O device 110 are aligned at the page boundary (when YES), processing proceeds to S230.

When the memory space and the register space of the I/O device 110 are not aligned at the page boundary (when NO), processing proceeds to S220.

In S220, in a BAR in which a base address other than the address of the page boundary is set, the control unit 228 sets either one of addresses of the page boundaries before and after the base address concerned.

Thereby, the memory space and the register space of the I/O device 110 can be aligned at the page boundary.

After S220, processing proceeds to S230.

In S230, the control unit 228 sets "device identifier", "base address", "size", and "attribute" of the I/O device 110 in the I/O allocation table 229 by using setting values of the PCI configuration register of I/O device 110. The control unit 228 sets "NULL (there being no allocated OS 231)" in "allocation destination" of the I/O allocation table 229.

FIG. 6 shows the I/O allocation table 229 after initialization processing according to the first embodiment. An example of the I/O allocation table 229 after initialization processing is shown in FIG. 6.

Figure 7:
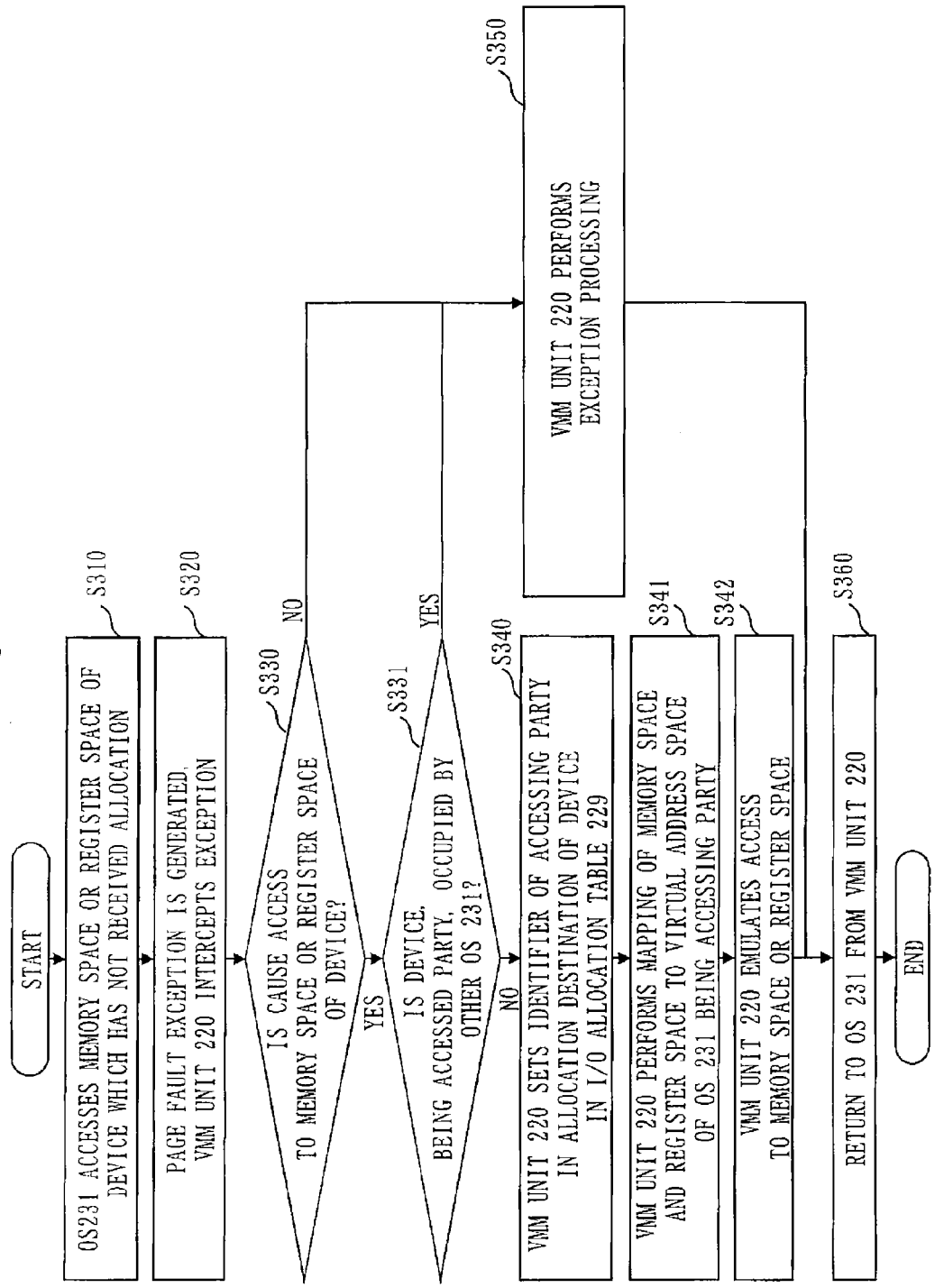
FIG. 7 is a flowchart showing allocation processing of an I/O device 110 according to the first embodiment.

FIG. 7 is a flowchart showing allocation processing of the I/O device 110 according to the first embodiment.

Allocation processing of the I/O device 110 of the first embodiment will be described based on FIG. 7.

When an access occurs to the memory space or the register space of the I/O device 110 which is not allocated to either of the OSs 231a-b, allocation processing of the I/O device 110 is performed as described below.

The case where an access occurs to the memory space of the I/O device 110a from the OS 231a will be hereinafter described. The contents of the processing in the case where an access occurs to the register space of the I/O device 110a from the OS 231a, or in the case where an access occurs to the memory space or the register space of the I/O device 110b or c from the OS 231a are also the same as what is described below. Furthermore, the contents of the processing in the case where an access occurs to the memory space or the register space of one of the I/O devices 110a-c from the OS 231b are also the same as what is described below.

In S310, the device driver 232a of the OS 231a accesses the memory space of the I/O device 110a. For example, the device driver 232a specifies the physical address of the memory space of the I/O device 110a, and outputs an access command to the processor 211a.

After S310, processing proceeds to S320.

In S320, the processor 211a refers to the mapping table generated by the memory management unit 224 when the VMM unit 220 was started. At this time, the virtual address corresponding to the physical address of the memory space of the I/O device 110a has not been set (mapped) in the mapping table. Therefore, the processor 211a invokes the VMM unit 220 by generating a page fault exception (or a TLB mistake exception, which applies hereinafter). The physical address of an accessed party is included in information (data) of the page fault exception.

For example, it is also preferable to set invocation of the VMM unit 220, which occurs at the time of a page fault exception occurrence, in an exception handler of the OSs 231a-b. Alternatively, it is also preferable to invoke the VMM unit 220 by using an exception interception function which is a part of a virtualization support function of the physical machine 200. Alternatively, it is also preferable to make the OSs 231a-b operate in a non-privileged mode, and to set invocation of the VMM unit 220, which occurs at the time of a page fault exception (an example of a privilege violation) occurrence, in an exception vector of the OSs 231a-b.

After S320, processing proceeds to S330.

In S330, the I/O allocation unit 223 of the VMM unit 220 refers to the I/O allocation table 229 and determines whether the cause of the page fault exception is access to the memory space or the register space of the I/O device 110a.

At this time, the I/O allocation unit 223 determines whether the physical address of the accessed party is included in each "area (0 to 5)" of each I/O device registered in the I/O allocation table 229. When the physical address of the accessed party is included in "area (0 to 5)" of one of I/O devices, the cause of the page fault exception is access to the memory space or the register space of the I/O device 110 concerned.

When the cause of the page fault exception is access to the memory space or the register space of the I/O device 110a (when YES), processing proceeds to S331. When the cause of the page fault exception is not access to the memory space or the register space of the I/O device 110a (when NO), processing proceeds to S350.

In S331, the I/O allocation unit 223 of the VMM unit 220 refers to the I/O allocation table 229 and determines whether the I/O device 110a being an accessed party is occupied by another OS 231b.

At this time, the I/O allocation unit 223 determines whether the identifier of another OS 231b is set in "allocation destination" correspondingly related to "device identifier" of the accessed party (the I/O device 110a) in the I/O allocation table 229. When the identifier of another OS 231b is set in "allocation destination", the I/O device 110a being an accessed party is occupied by another OS 231b.

When the I/O device 110a being an accessed party is occupied by another OS 231b (when YES), processing proceeds to S350.

When the I/O device 110a being an accessed party is not occupied by another OS 231b (when NO), processing proceeds to S340.

In S340, the I/O allocation unit 223 of the VMM unit 220 performs setting in the I/O allocation table 229. At this time, the I/O allocation unit 223 sets the identifier of the accessing party (the OS 231*a*) in "allocation destination" correspondingly related to "device identifier" of the accessed party (the I/O device 110*a*).

After S340, processing proceeds to S341.

In S341, the memory management unit 224 of the VMM unit 220 refers to the I/O allocation table 229, and performs mapping of all the memory spaces and register spaces shown in "area (0 to 5)" correspondingly related to "device identifier" of the accessed party (the I/O device 110*a*) to the virtual address space of the OS 231*a* being the accessing party. That is, the memory management unit 224 sets the physical address of "area (0-5)" concerned and the virtual address of the virtual address space of the OS 231*a* to be corresponding to each other in the mapping table.

After S341, processing proceeds to S342.

In S342, the I/O emulation unit 222 of the VMM unit 220 emulates access to the memory space of the I/O device 110*a*. That is, the I/O emulation unit 222 accesses the memory space of the I/O device 110*a*, instead of the device driver 232*a* of the OS 231*a*. For example, the I/O emulation unit 222 outputs an access command to the processor 211*a*, and then, the processor 211*a* accesses the memory space of the I/O device 110*a*.

After S342, processing proceeds to S360.

In S350, the control unit 228 of the VMM unit 220 performs predetermined exception processing for a page fault exception. For example, the control unit 228 provides an error notification to the OS 231*a*, or emulates the page fault exception.

After S350, processing proceeds to S360.

In S360, the control unit 228 of the VMM unit 220 returns control to the OS 231*a*.

Allocation processing of the I/O device 110 is finished through S360.

In the case where the I/O device 110*a* is allocated to the OS 231*a*, and mapping is performed between the memory space of the I/O device 110*a* and the virtual address space of the OS 231*a*, the processor 211*a* does not generate a page fault exception even if access occurs from the OS 231*a* to the memory space of the I/O device 110*a*, and accesses the memory space of the I/O device 110*a* according to an access command. In this case, the VMM unit 220 does not emulate the access to the memory space of the I/O device 110*a*.

FIG. 8 shows the I/O allocation table 229 after allocating the I/O devices 110 *a-b* according to the first embodiment.

FIG. 8 shows the I/O allocation table 229 in the case where the I/O device 110*a* is allocated to the OS 231*a* which accessed the memory of the I/O device 110*a*, and the I/O device 110*b* is allocated to the OS 231*b* which accessed the memory or the register of the I/O device 110*b*.

Figure 9:
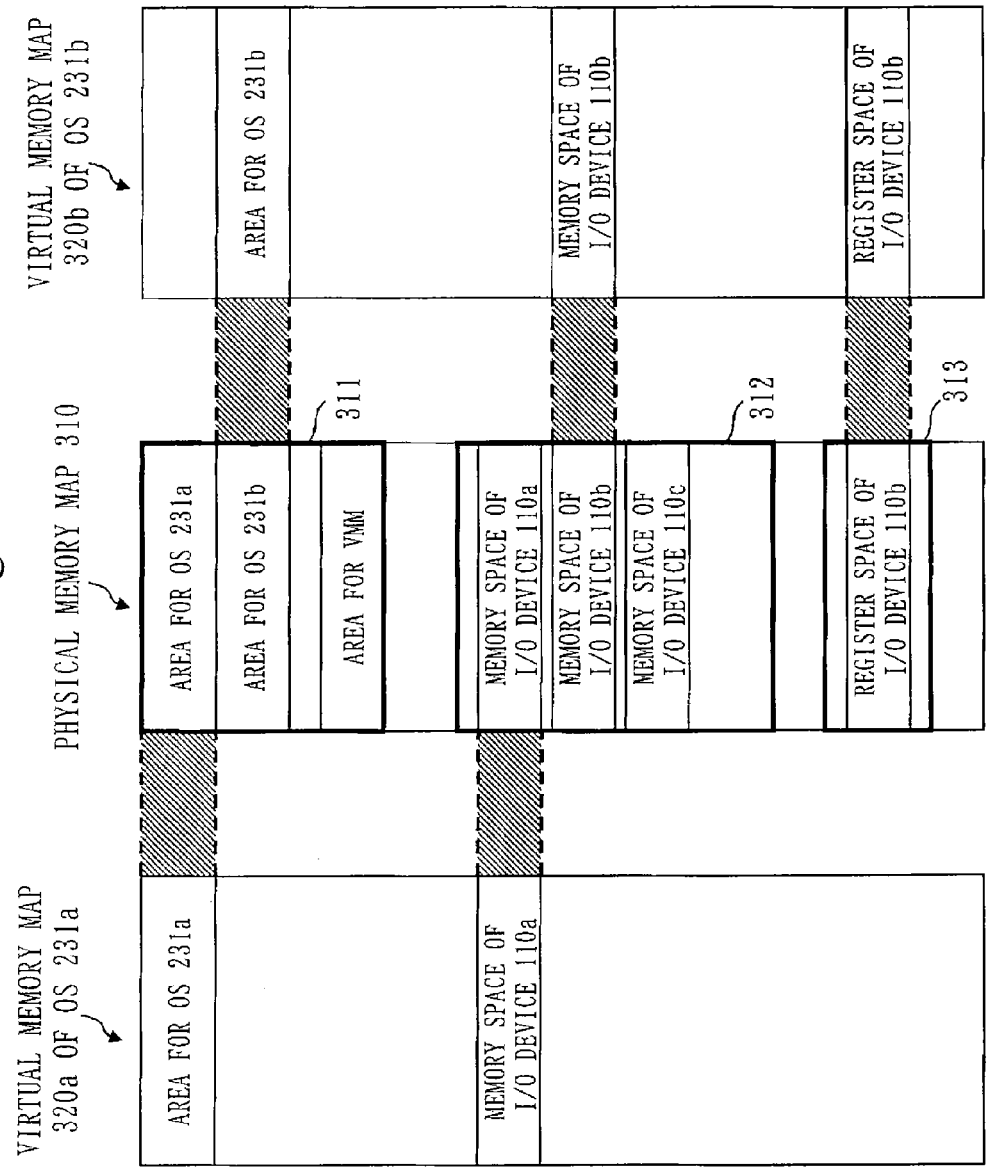
FIG. 9 shows virtual memory maps 320a-b after allocating the I/O devices 110a-b according to the first embodiment.

FIG. 9 shows virtual memory maps 320 *a-b* after the I/O devices 110 *a-b* having been allocated, according to the first embodiment.

FIG. 9 shows the virtual memory map 320*a* in the case where the memory space of the I/O device 110*a* has been mapped to the virtual address space of the OS 231*a*, and the virtual memory map 320*b* in the case where the memory space and the register space of the I/O device 110*b* haven been mapped to the virtual address space of the OS 231*b*.

Figure 10:
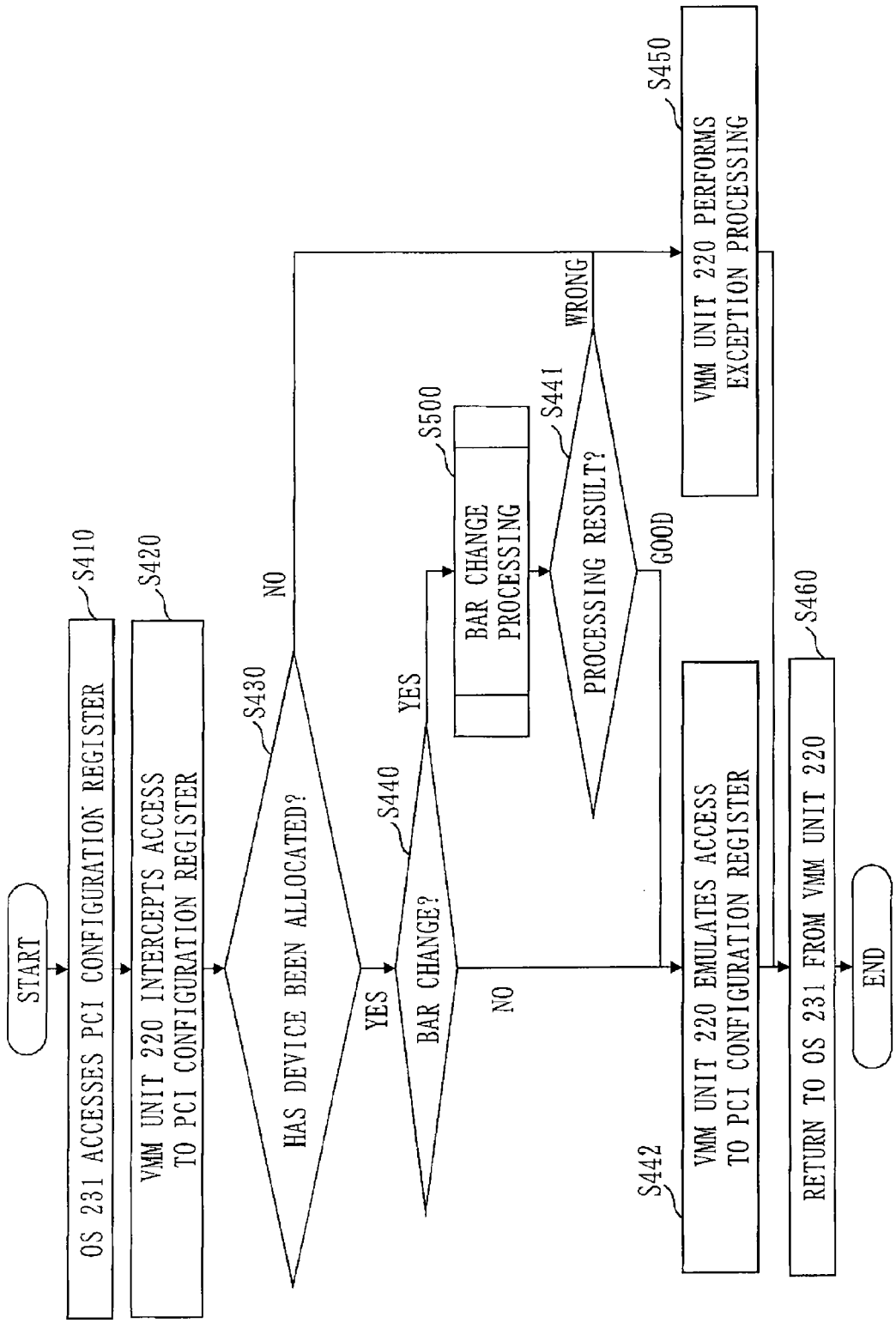
FIG. 10 is a flowchart showing processing of accessing a PCI configuration register according to the first embodiment.

FIG. 10 is a flowchart showing processing of accessing a PCI configuration register according to the first embodiment.

Processing in the case where the PCI driver 233*a* of the OS 231*a* accesses the PCI configuration register of the I/O device 110*a* will be described based on FIG. 10. However, the contents of the processing in the case where the PCI driver 233*a* of the OS 231*a* accesses the PCI configuration register of the I/O device 110 *b* or *c* are also the same as what is described below. Furthermore, the contents of the processing in the case where the PCI driver 233*b* of the OS 231*b* accesses the PCI configuration register of the I/O device 110*a*, *b*, or *c* are also the same as what is described below.

In S410, the PCI driver 233*a* of the OS 231*a* accesses the PCI configuration register of the I/O device 110*a*. For example, specifying the address and the register number in the PCI configuration register of the I/O device 110*a*, the PCI driver 233*a* outputs an access command to the processor 211*a*.

After S410, processing proceeds to S420.

In S420, the VMM unit 220 intercepts the access to the PCI configuration register of the I/O device 110*a*.

For example, a page where a register (a CONFIG_ADDR register and a CONFIG_DATA register) for accessing the PCI configuration space is arranged is set in the processors 211*a-b* as a page which cannot be accessed from the OSs 231*a-b*. Then, when access to the page concerned (access to the PCI configuration register) occurs from the OS 231*a* or *b*, the processor 211*a* or *b* generates a page fault exception (or a TLB mistake exception, which applies hereinafter) and invokes the VMM unit 220. It is also preferable that the OS 231*a* or *b* invokes the VMM unit 220 in order to access the register which is for accessing the PCI configuration space. Moreover, when the register for accessing the PCI configuration space is mapped not to the memory space but to the I/O address space, it is also preferable to invoke the VMM unit 220 by a protection function of the I/O address space.

After S420, processing proceeds to S430.

In S430, the PCI emulation unit 221 of the VMM unit 220 refers to the I/O allocation table 229, and determines whether the I/O device 110*a* (PCI device) being the accessed party is allocated to the OS 231*a* being the accessing party. When the identifier of the accessing party (the OS 231*a*) has been set in "allocation destination" correspondingly related to "device identifier" of the accessed party (the I/O device 110*a*), the I/O device 110*a* being the accessed party is allocated to the OS 231*a* being the accessing party.

When the I/O device 110*a* being the accessed party is allocated to the OS 231*a* being the accessing party (when YES), processing proceeds to S440.

When the I/O device 110*a* being the accessed party is not allocated to the OS 231*a* being the accessing party (when NO), processing proceeds to S450.

In S440, the PCI emulation unit 221 of the VMM unit 220 determines whether the access contents include change of the BAR of the PCI configuration register.

When the access contents include change of the BAR of the PCI configuration register (when YES), processing proceeds to BAR change determination processing (S500), and then, proceeds to S441. The BAR change determination processing (S500) will be separately described.

When the access contents do not include change of the BAR of the PCI configuration register (when NO), processing proceeds to S442.

In S441, when the processing result of the BAR change determination processing (S500) is "GOOD", processing proceeds to S442. When the processing result of the BAR change determination processing (S500) is "WRONG", processing proceeds to S450.

In S442, the PCI emulation unit 221 of the VMM unit 220 emulates access to the PCI configuration register. At this time, the PCI emulation unit 221 accesses the PCI configuration register, instead of the PCI driver 233*a*. For example, the PCI emulation unit 221 outputs an access command to the processor 211a, and the processor 211a accesses the PCI configuration register.

After S442, processing proceeds to S460.

In S450, the PCI emulation unit 221 of the VMM unit 220 performs predetermined exception processing which is to be executed when accessing the PCI configuration register. For example, the PCI emulation unit 221 provides an error notification to the OS 231a.

After S450, processing proceeds to S460.

In S460, the PCI emulation unit 221 of the VMM unit 220 returns control to the OS 231a.

The processing of accessing the PCI configuration register is finished through S460.

Figure 11:
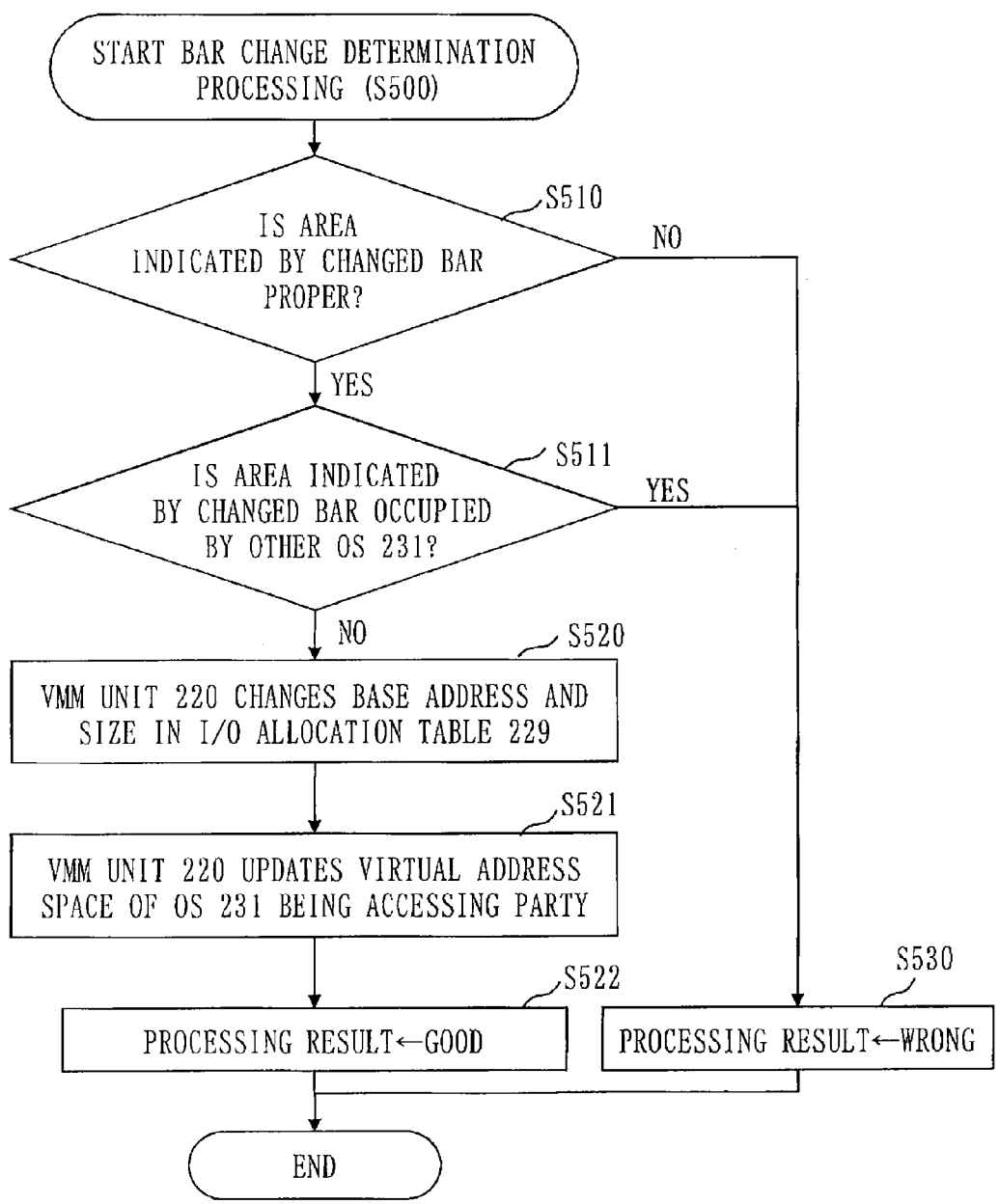
FIG. 11 is a flowchart showing a BAR change determination processing (S500) according to the first embodiment.

FIG. 11 is a flowchart showing BAR change determination processing (S500) according to the first embodiment.

The BAR change determination processing (S500) included in the processing (refer to FIG. 10) of accessing the PCI configuration register will be described based on FIG. 11.

In S510, the PCI emulation unit 221 of the VMM unit 220 determines whether the storage area indicated by a changed BAR is a proper storage area or not. For example, when the base address of the changed BAR coincides with the address of the page boundary, the PCI emulation unit 221 determines that the storage area indicated by the changed BAR is a proper storage area. Furthermore, the PCI emulation unit 221 determines whether the storage area indicated by the changed BAR can be within the range of the memory space 312 for I/O or the register space 313 for I/O.

When the storage area indicated by the changed BAR is a proper storage area (when YES), processing proceeds to S511.

When the storage area indicated by the changed BAR is not a proper storage area (when NO), the processing result of the BAR change determination processing (S500) is "WRONG" (S530).

In S511, the PCI emulation unit 221 of the VMM unit 220 refers to the I/O allocation table 229, and determines whether the storage area indicated by the changed BAR is occupied by another OS 231b.

At this time, the PCI emulation unit 221 determines whether some or all of the storage area indicated by the changed BAR is included in "area (0 to 5)" correspondingly related to "allocation destination" where the identifier of OS 231b other than the accessing party has been set.

When the storage area indicated by the changed BAR is occupied by another OS 231b (when YES), the processing result of the BAR change determination processing (S500) is "WRONG" (S530).

When the storage area indicated by the changed BAR is not occupied by another OS 231b (when NO), processing proceeds to S520.

In S520, the PCI emulation unit 221 of the VMM unit 220 changes "base address" and "size" of "area (one of 0-5)" corresponding to the changed BAR, in "area (0 to 5)" correspondingly related to "device identifier" of the accessed party (the I/O device 110a) in the I/O allocation table 229.

After S520, processing proceeds to S521.

In S521, the memory management unit 224 of the VMM unit 220 changes the mapping table of the I/O device 110a according to the change of the BAR. That is, the memory management unit 224 unmaps the storage area indicated by the BAR before being changed from the virtual address space of the I/O device 110a, and maps the storage area indicated by the changed BAR to the virtual address space of the I/O device 110a.

The processing result of the BAR change determination processing (S500) is "GOOD" (S522).

Now, the hardware of the virtual machine system 100 according to the embodiment will be supplementarily described.

The processors 211a-b are connected through a bus (not shown) to the main memory 212, the auxiliary storage device 213, the interruption controller 214, the I/O devices 110a-c and other hardware so as to control these hardware elements.

The main memory 212 or the auxiliary storage device 213 stores programs and files (not shown).

The programs include programs for executing functions each described as a "-unit" in embodiments. The programs (e.g., an access control program, and a virtual machine program) are retrieved and executed by the processor 211. In other words, the programs cause a computer to function as a "-unit" and cause a computer to execute a procedure or a method of a "-unit".

The files include various data (inputs, outputs, determination results, calculation results, processing results, and the like) used by a "-unit" described in embodiments.

Arrows included in configuration diagrams and flowcharts in embodiments mainly indicate input/output of data or signals.

Processing described based on a flowchart and the like is executed using hardware 210 (e.g., the processor 211).

In the explanation of embodiments, that which is described as a "-unit" may be a "-circuit", a "-device", or a "-equipment", or may also be a "-step", a "-procedure", or a "-process". In other words, that which is described as a "-unit" may be implemented by firmware, software, hardware, or a combination of these.

The OSs 231a-b of the virtual machine according to the first embodiment are examples of a plurality of OSs that operate in the physical machine 200. It is also preferable to implement a multi-operating system in the physical machine 200 such that a plurality of OSs other than the OS of the virtual machine are operated by the physical machine 200.

According to the first embodiment, the register space of the PCI device is mapped to the memory space in the physical machine 200. However, the register space of the PCI device may also be mapped to the I/O address space in the physical machine 200 like a PC/AT compatible machine (PC/AT being a registered trademark). For example, in the case of Intel x86 CPU (Intel being a registered trademark), protection of the register space of a PCI device having been mapped to the I/O address space can be realized by using an I/O privilege level, an I/O permission bitmap, or an I/O access interception function of a virtualization support function of hardware.

According to the first embodiment, the physical machine 200 does not previously allocate the I/O devices 110a-c to the OSs 231a-b. Instead, when an access occurs to the memory space or the register space of the I/O device 110a from the OS 231a, the physical machine 200 allocates the I/O device 110a concerned to the OS 231a concerned in the order of occurrence of access. Thereby, the physical machine 200 protects the memory space, the register space, and the PCI configuration register of the I/O device 110a concerned from the OS 231b which is other than the OS 231a concerned. That is, the physical machine 200 prevents the I/O device 110a concerned from being accessed by the OS 231b which is other than the OS 231a to which the I/O device 110a concerned is allocated.

According to the first embodiment, it is unnecessary to previously set allocation of the I/O devices 110a-c, and it is possible to protect the memory space, the register space, and the PCI configuration register of the I/O device 110a having been allocated to the OS 231a from other OS 231b.

In the first embodiment, the computing machine (the physical machine 200) such as the following has been described.

The computing machine makes a plurality of OSs (the OSs 231a-b) that access devices (the I/O devices 110a-c) operate.

The computing machine includes a device allocation storage unit and an access management unit (the VMM unit 220).

The device allocation storage unit stores a device allocation table (the I/O allocation table 229) that correspondingly relates the device to the OS to which the device is allocated.

When access to the device occurs, the access management unit determines an OS to which the device is allocated, based on the device allocation table. When the device is not allocated to any OS, the access management unit updates the device allocation table in order to correspondingly relate the device to the OS being an accessing party, and allows the access to the device. When the device is allocated to an OS other than the OS being the accessing party, the access management unit denies the access to the device.

The device allocation table is data showing correspondence between the physical address space of the device and the OS to which the device is allocated.

When the device is not allocated to any OS, the access management unit further maps the physical address space of the device indicated by the device allocation table to the virtual address space of the OS being the accessing party.

When access to the PCI configuration register of the device occurs, the access management unit determines the OS to which the device is allocated, based on the device allocation table. When the device is allocated to the OS being an accessing party, the access management unit allows the access to the PCI configuration register. When the device is not allocated to the OS being an accessing party, the access management unit denies the access to the PCI configuration register.

When the access to the PCI configuration register is a change of the base address and the device is allocated to the OS being the accessing party, the access management unit operates as described below. The access management unit updates information of the physical address space of the device in the device allocation table, based on a changed base address. The access management unit maps the physical address space of the device indicated by the updated information to the virtual address space of the OS being the accessing party.

Second Embodiment

There will be described an embodiment in which, depending upon the type of a device to be accessed, a plurality of OSs (or all the OSs) are allowed to read data from a memory or a register of the device.

Points different from those of the first embodiment will be mainly described hereinafter. Points whose description is omitted are the same as those of the first embodiment.

The configuration of the virtual machine system 100 is the same as that of the first embodiment (refer to FIG. 1).

However, the configuration of the I/O allocation table 229 differs partly.

FIG. 12 shows the I/O allocation table 229 according to a second embodiment.

The I/O allocation table 229 of the second embodiment will be described based on FIG. 12.

The I/O allocation table 229 includes "device type" in addition to the items (refer to FIGS. 4, 6, and 8) described in the first embodiment.

"Device type" indicates a device type (e.g., bridge) of the I/O device 110.

The I/O allocation table 229 of FIG. 12 shows that the I/O device 110c is "bridge". The I/O device 110c (bridge) is not allocated to either of the OSs 231a-b.

Since the PCI configuration register of a PCI Express switch or a PCI bridge (both are examples of a bridge) is related to other PCI device by a tree structure, it may be referred to by a plurality of OSs 231a-b.

Then, according to the second embodiment, the I/O device 110c whose allocation type is "bridge" is not allocated to either of the OSs 231a-b, and access to the PCI configuration register from each of the OSs 231a-b is allowed in read-only.

With respect to write to the PCI configuration register of the I/O device 110c, only specific management OSs, such as an OS (not shown) of the third VM unit and an OS (not shown) of the physical machine 200 are allowed to perform the write.

However, it is also preferable that memories, registers, or PCI configuration registers of the I/O devices 110a-b other than the bridge are read-only for the OSs 231a-b.

Figure 13:
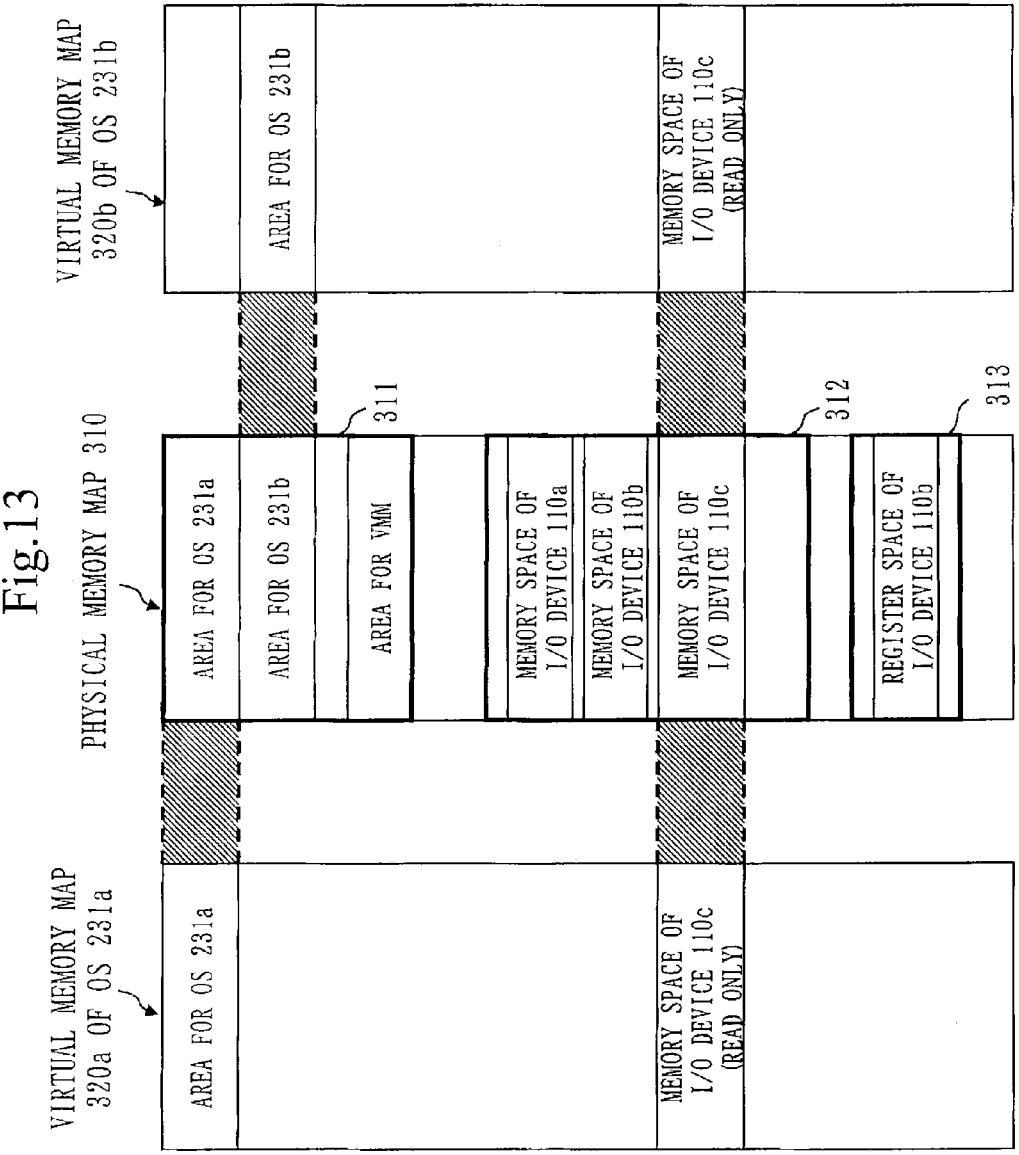
FIG. 13 shows a memory map of the virtual machine system 100 according to the second embodiment.

FIG. 13 shows a memory map of the virtual machine system 100 according to the second embodiment.

As shown in FIG. 13, the memory space of the I/O device 110c is mapped to the virtual memory maps 320 (virtual address spaces) of both the OS 231a and the OS 231b. At this time, the memory management unit 224 sets, in the mapping table, an access attribute indicating that the memory space of the I/O device 110c is read-only. The memory management unit 224 maps the memory space of the I/O device 110c to the virtual address space of the management OS when needed, and sets, in the mapping table, an access attribute indicating that the memory space of the I/O device 110c is writable.

Figure 14:
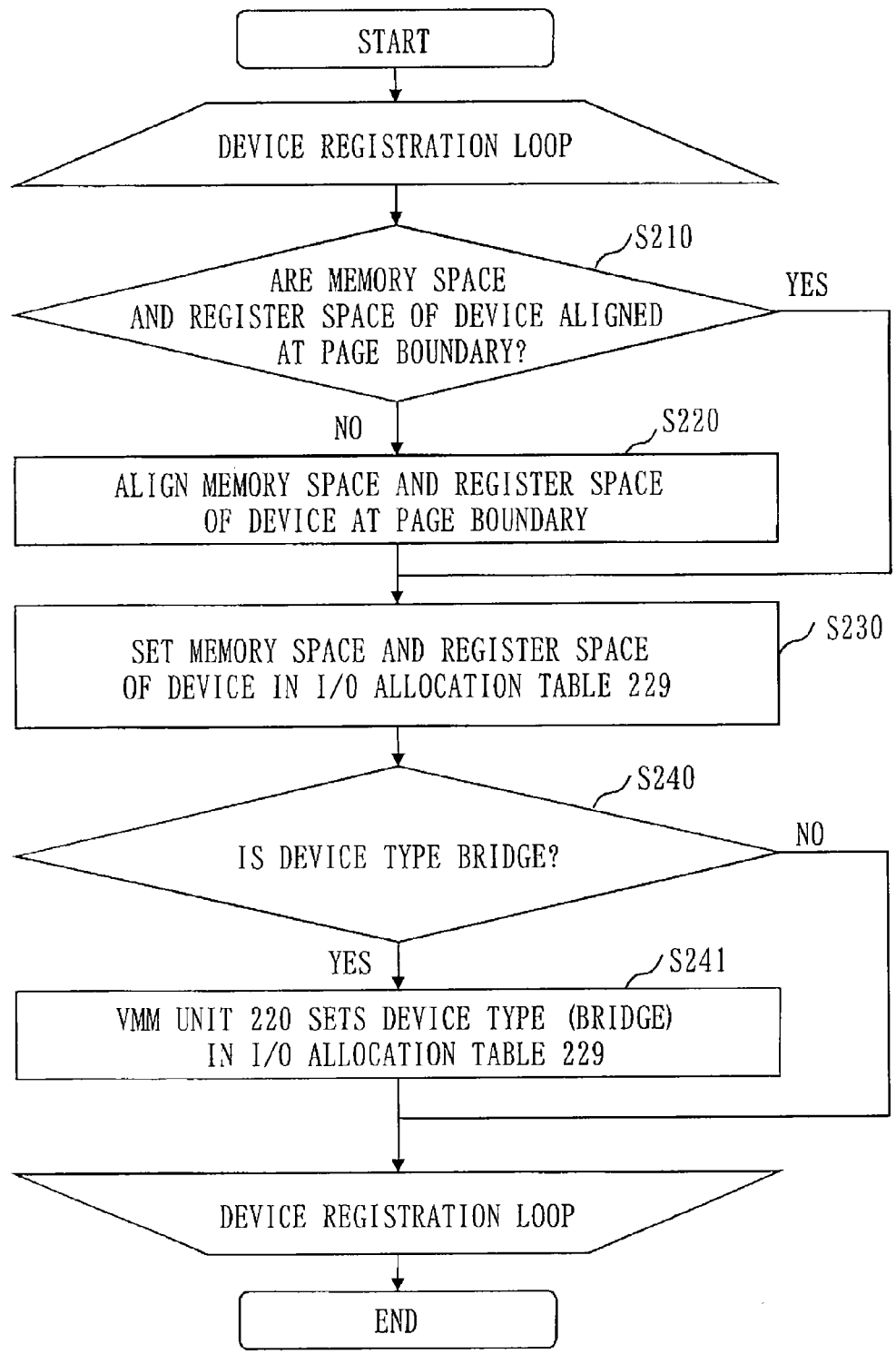
FIG. 14 is a flowchart showing initialization processing of the I/O allocation table 229 according to the second embodiment.

FIG. 14 is a flowchart showing initialization processing of the I/O allocation table 229 according to the second embodiment.

Initialization processing of the I/O allocation table 229 of the second embodiment will be described based on FIG. 14.

The initialization processing of the I/O allocation table 229 includes S240 and S241 in addition to the processing (refer to FIG. 5) explained in the first embodiment. Hereafter, S240 and S241 will be described.

In S240, the control unit 228 of the VMM unit 220 refers to the PCI configuration register (including information on the device type) of the I/O device 110, and determines whether the I/O device 110 is a PCI Express switch or a PCI bridge.

When the I/O device 110 is a PCI Express switch or a PCI bridge (when YES), processing proceeds to S241.

When the I/O devices 110 is neither a PCI Express switch nor a PCI bridge (when NO), processing for the I/O device 110 concerned is finished.

In S241, the control unit 228 of the VMM unit 220 sets "bridge" as "device type" correspondingly related to "device identifier" of the I/O device 110, in the I/O allocation table 229.

The processing for the I/O device 110 concerned is finished through S241.

Figure 15:
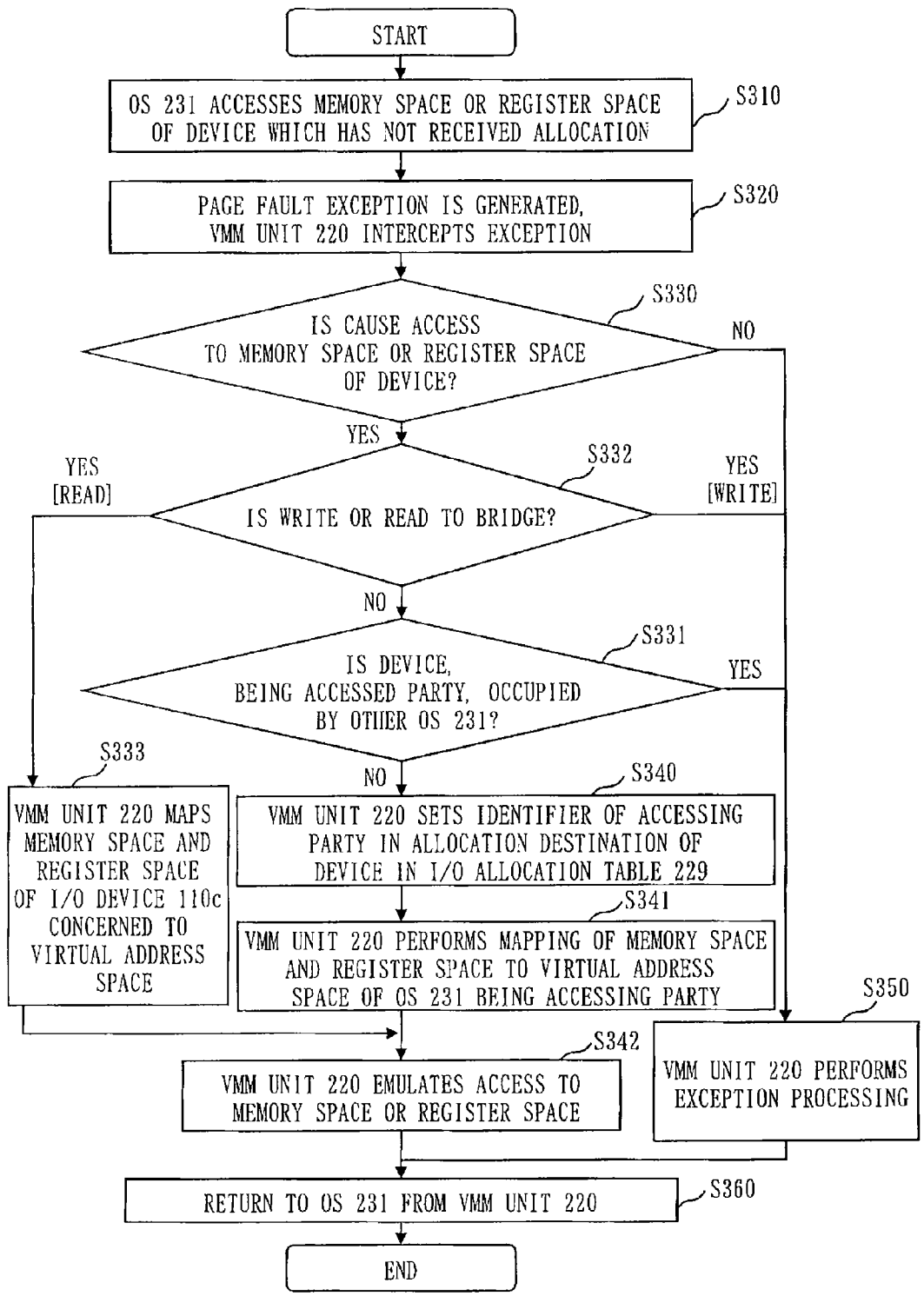
FIG. 15 is a flowchart showing allocation processing of the I/O device 110 according to the second embodiment.

FIG. 15 is a flowchart showing allocation processing of the I/O device 110 according to the second embodiment.

Allocation processing of the I/O device 110 of the second embodiment will be described based on FIG. 15.

The allocation processing of the I/O device 110 includes S332 and S333 in addition to the processing (refer to FIG. 7) explained in the first embodiment. Hereafter, S332 will be described.

In S332, the I/O allocation unit 223 of the VMM unit 220 determines whether the access from the OS 231a or b is a write or a read to the memory space or the register space of the bridge (the I/O device 110e) or not.

At this time, the I/O allocation unit 223 determines whether the content of the access command is "write" or "read", or not. Moreover, the I/O allocation unit 223 refers to the I/O allocation table 229, and determines whether "device type" correspondingly related to "device identifier" of the I/O device 110 being an accessed party is "bridge" or not. When the content of the access command is "write" or "read", and "device type" is "bridge", the access from the OS 231a or b is a write or a read to the memory space or the register space of the bridge (the I/O device 110c).

When the access from the OS 231a or b is a write to the memory space or the register space of the bridge (the I/O device 110c) (when YES [write]), processing proceeds to S350.

When the access from the OS 231a or b is a read to the memory space or the register space of the bridge (the I/O device 110e) (when YES [read]), processing proceeds to S333.

When the access from the OS 231a or b is neither a write nor a read to the memory space or the register space of the bridge (the I/O device 110c) (when NO), processing proceeds to S331.

In S333, the I/O allocation unit 223 does not perform registration with the I/O allocation table 229, but maps the memory space and register space of the I/O device 110c concerned, with read only, to the virtual address space.

After S333, processing proceeds to S342.

Figure 16:
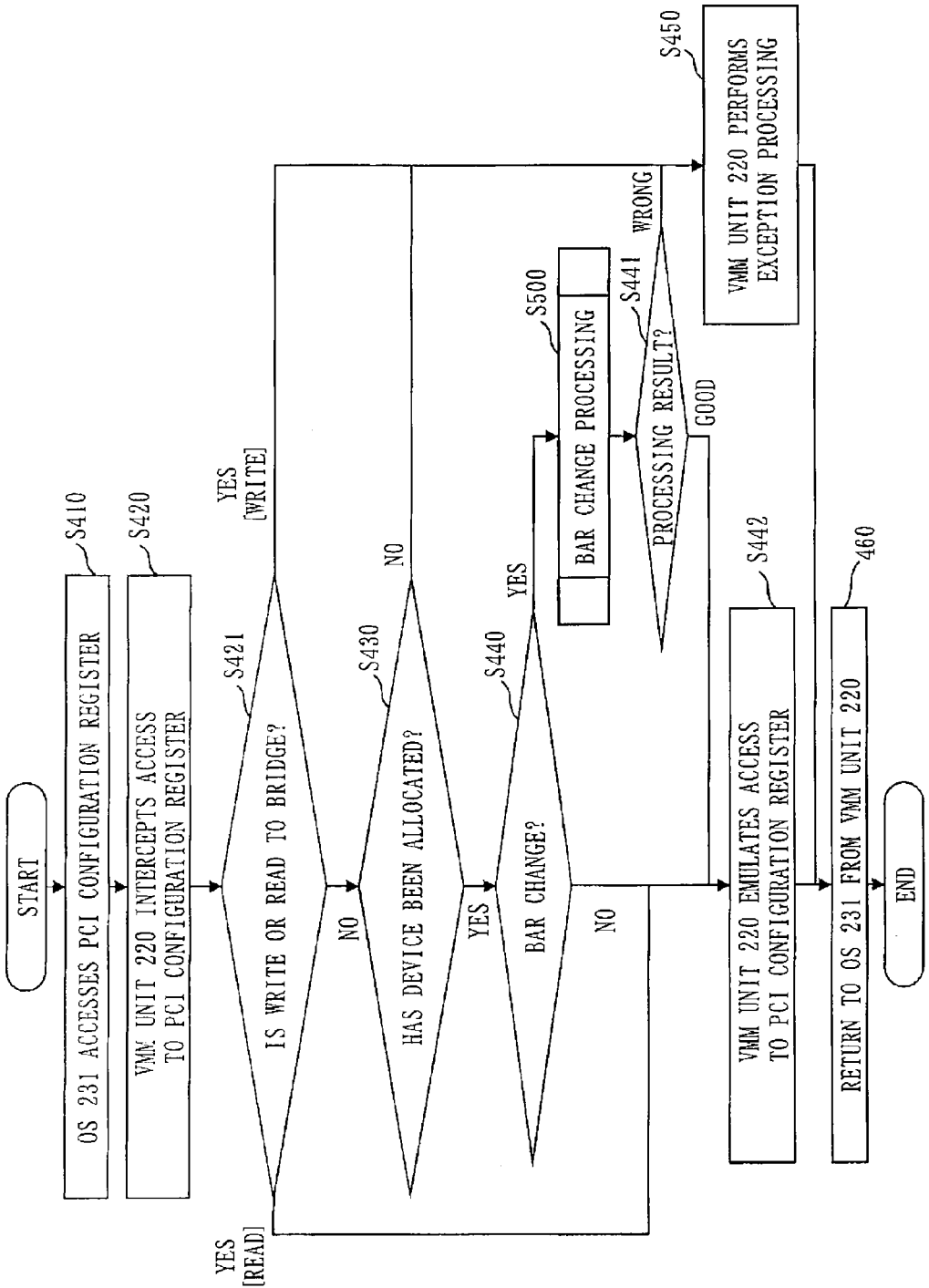
FIG. 16 is a flowchart showing processing of accessing a PCI configuration register according to the second embodiment.

FIG. 16 is a flowchart showing processing of accessing a PCI configuration register according to the second embodiment.

Processing of accessing a PCI configuration register of the second embodiment will be described based on FIG. 16.

The processing of accessing a PCI configuration register includes S421 in addition to the processing (refer to FIG. 10) explained in the first embodiment. S421 will be described hereinafter.

In S421, the PCI emulation unit 221 of the VMM unit 220 determines whether the access from the OS 231a or b is a write or a read to the PCI configuration register of the bridge (the I/O device 110c) or not.

When the access from the OS 231a or b is a write to the PCI configuration register of the bridge (the I/O device 110c) (when YES [write]), processing proceeds to S450.

When the access from the OS 231a or b is a read to the PCI configuration register of the bridge (the I/O device 110c) (when YES [read]), processing proceeds to S442 while omitting to inspect whether the device is allocated to the own OS.

When the access from the OS 231a or b is neither a write nor a read to the PCI configuration register of the bridge (the I/O device 110c) (when NO), processing proceeds to S430.

In S421, it is also preferable for the PCI emulation unit 221 to determine whether the access to write to the PCI configuration register of the bridge (the I/O device 110c) is an access from a predetermined management OS or not. When the access to write to the PCI configuration register of the bridge (the I/O device 110c) is an access from a predetermined management OS, it proceeds not to S450, but to S430. That is, the PCI emulation unit 221 permits a write to the PCI configuration register.

According to the second embodiment, it is possible to prevent a defect resulting from that a certain OS 231a occupies a PCI bridge (an example of a device of a predetermined type) without permission, or changes a PCI configuration register of a PCI bridge without permission. For example, it is possible to prevent a defect in that another OS 231b is unable to access the PCI bridge concerned and thus the tree structure of the PCI cannot be followed after the PCI bridge concerned.

In the second embodiment, the computing machine (the physical machine 200) such as the following has been described, for example.

When an access to write to a PCI configuration register of a device (e.g., bridge) of a predetermined type occurs, the access management unit (the VMM unit 220) denies the write access. When an access to read to the PCI configuration register of the device of the predetermined type occurs, the access management unit allows the read access.

When an access to write to the PCI configuration register of the device of the predetermined type occurs from a predetermined management OS, the access management unit allows the write access.

Third Embodiment

There will be described an embodiment in which the result of the last allocation of the I/O devices 110a-c is used in the virtual machine system 100 to be performed next.

Points different from those of the first and second embodiments will be mainly described hereinafter. Points whose description is omitted are the same as those of the first and second embodiments.

Figure 17:
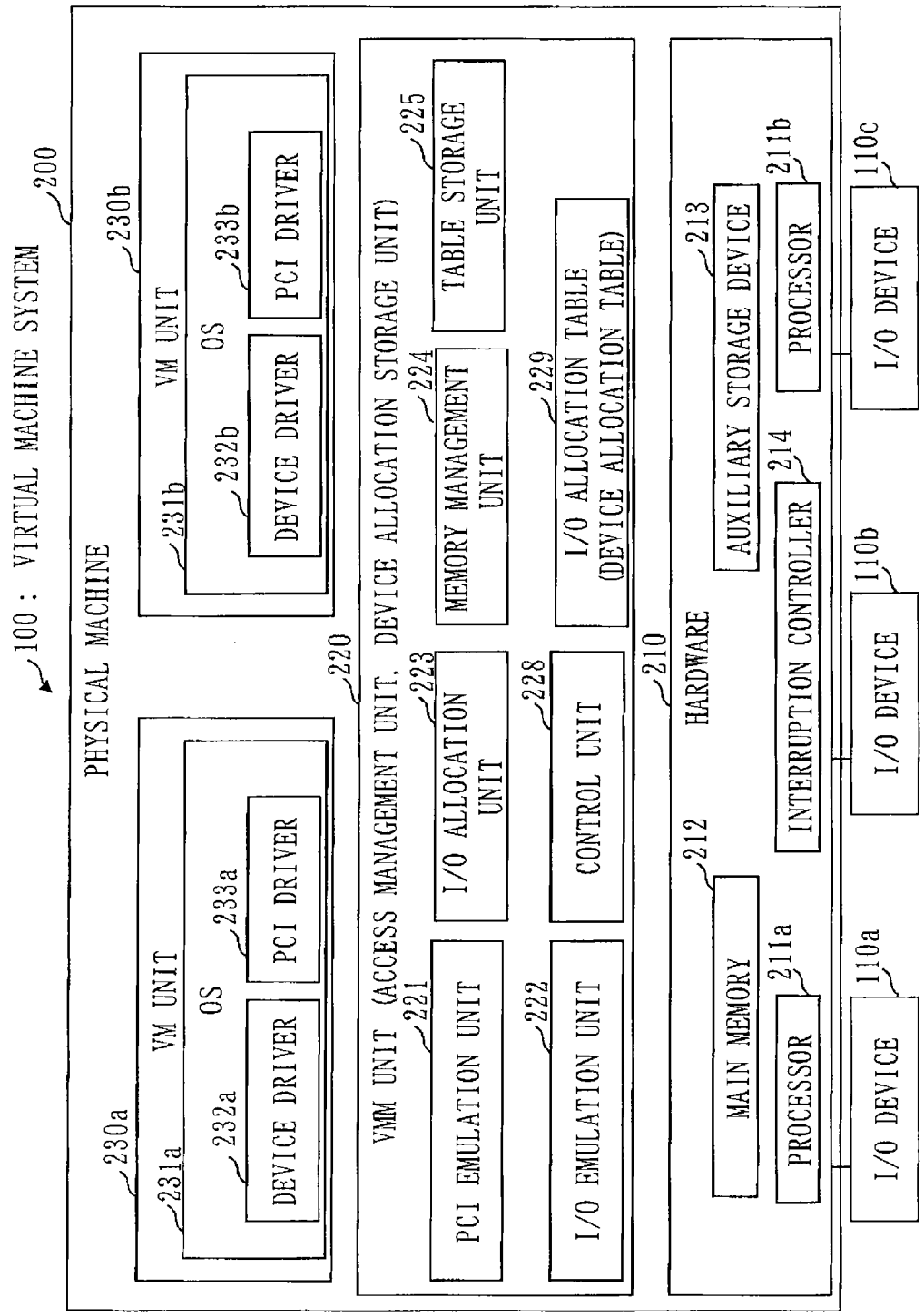
FIG. 17 is a configuration diagram of the virtual machine system 100 according to a third embodiment.

FIG. 17 shows a configuration diagram of the virtual machine system 100 according to a third embodiment.

The configuration of the virtual machine system 100 of the third embodiment will be described based on FIG. 17.

The VMM unit 220 of the physical machine 200 includes a table storage unit 225 in addition to the configuration (refer to FIG. 1) described in the first embodiment.

The table storage unit 225 stores the I/O allocation table 229 (refer to FIG. 12) in the auxiliary storage device 213 when execution of the VMM unit 220 is finished (or when execution of the VM unit 230a-b is finished). The stored I/O allocation table 229 is to be used for initialization processing of the I/O allocation table 229 at the next or subsequent staring time of the physical machine 200.

Figure 18:
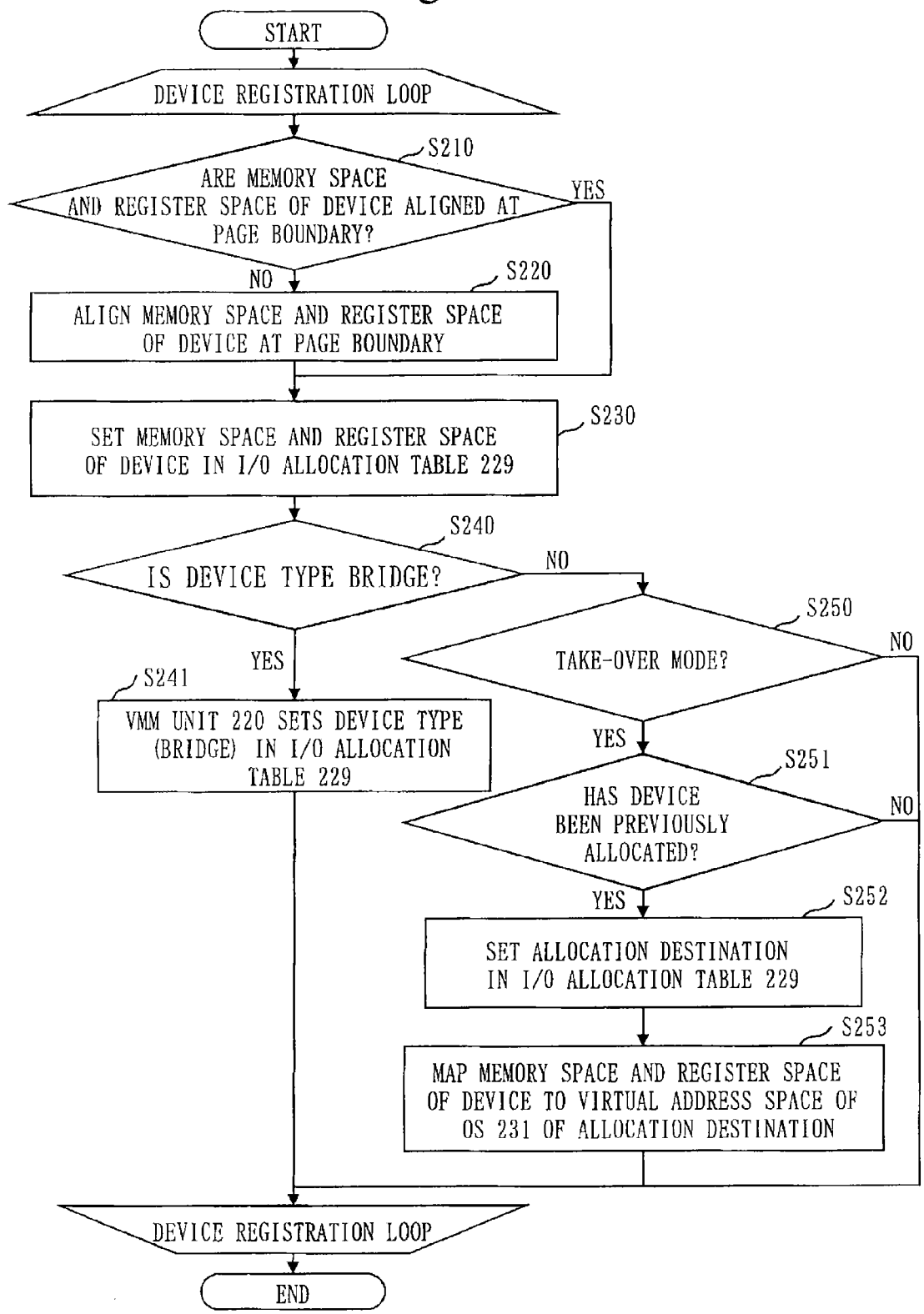
FIG. 18 is a flowchart showing initialization processing of the I/O allocation table 229 according to the third embodiment.

FIG. 18 is a flowchart showing initialization processing of the I/O allocation table 229 according to the third embodiment.

Initialization processing of the I/O allocation table 229 of the third embodiment will be described based on FIG. 18.

The initialization processing of the I/O allocation table 229 includes S250 to S253 in addition to the processing (refer to FIG. 14) explained in the second embodiment. S250 to S253 will be described hereinafter.

In S240, when the I/O device 110 is neither a PCI Express switch nor a PCI bridge (when NO), processing proceeds to S250.

When applying the third embodiment to the initialization processing (refer to FIG. 5) of the I/O allocation table 229 of the first embodiment, it proceeds to S250 after S230.

In S250, the control unit 228 of the VMM unit 220 determines whether the VMM unit 220 was started in the mode (referred to hereinafter as a "take-over mode") of using the last (or previous) I/O allocation table 229 stored by the table storage unit 225. For example, the user starts the VMM unit 220 while specifying, as a starting option, a mode type indicating whether it is a take-over mode or not, and the control unit 228 executes determination according to the mode type of the starting option. Alternatively, the user may switch the mode with a DIP switch of the physical machine 200. The last (or previous) I/O allocation table 229 is referred to as a "stored allocation table" hereafter.

When the VMM unit 220 was started in the take-over mode (when YES), processing proceeds to S251.

When the VMM unit 220 was not started in the take-over mode (when NO), the processing for the I/O device 110 concerned is finished.

In S251, the control unit 228 refers to the stored allocation table in the auxiliary storage device 213, and determines whether the I/O device 110 concerned has been previously allocated to either of the OSs 231a-b.

That is, referring to the stored allocation table, the control unit 228 determines whether either one of the OSs 231a-b is set in "allocation destination" correspondingly related to "device identifier" of the I/O device 110 concerned.

When the I/O device 110 concerned has been previously allocated to either one of the OSs 231a-b (when YES), processing proceeds to S252.

When the I/O device 110 concerned has not been previously allocated to either of the OSs 231a-b (when NO), processing for the I/O device 110 concerned is finished.

In S252, the control unit 228 allocates the I/O device 110 concerned to the OS 231 (a or b) to which the I/O device 110 concerned has been previously allocated. That is, the control unit 228 sets the identifier of the OS 231 to which the I/O device 110 concerned has been previously allocated, in "allocation destination" correspondingly related to "device identifier" of the I/O device 110, in the I/O allocation table 229.

After S252, processing proceeds to S253.

In S253, the control unit 228 (or the memory management unit 224) refers to the I/O allocation table 229, and maps the memory space and the register space (physical address space) of the I/O device 110 concerned to the virtual address space of the OS 231 to which the I/O device 110 concerned has been previously allocated.

The processing for the I/O device 110 concerned is finished through S253.

According to the third embodiment, the overhead required to allocate the I/O devices 110a-c to each of the OSs 231a-b and to perform mapping can be reduced by using the I/O allocation table 229 stored in the auxiliary storage device 213.

In the third embodiment, the computing machine (the physical machine 200) such as the following has been described, for example.

The access management unit (the VMM unit 220) stores a device allocation table (the I/O allocation table 229) as a stored allocation table when the operation is finished, and generates a new device allocation table by using the stored allocation table when operation is started.

REFERENCE SIGNS LIST

100: virtual machine system, 110: I/O device, 200: physical machine, 210: hardware, 211: processor, 212: main memory, 213: auxiliary storage device, 214: interruption controller, 220: VMM unit, 221: PCI emulation unit, 222: I/O emulation unit, 223: I/O allocation unit, 224: memory management unit, 225: table storage unit, 228: control unit, 229: I/O allocation table, 230: VM unit, 231: OS, 232: device driver, 233: PCI driver, 310: physical memory map, 311: memory space for VM, 312: memory space for I/O, 313: register space for I/O, 320: virtual memory map

The invention claimed is:

1. A computing machine, where a plurality of OSs (Operating Systems) each operate and are configured to access a device, comprising:
a memory configured to store a device allocation table to allocate the device to one of the plurality of OSs, in order of occurrence of access; and
processing circuitry configured, when an access to the device occurs, to determine to which OS of the plurality of OSs the device is allocated, based on the device allocation table, when the device is not allocated to any OS, to update the device allocation table in order to allocate the device to an OS being an accessing party and to allow the access to the device, and when the device is allocated to an OS other than the OS being the accessing party, to deny the access to the device,
wherein
the device allocation table is data correspondingly indicating a physical address space of the device and the OS to which the device is allocated, and
when the device is not allocated to any OS, the processing circuitry further maps all of the physical address space of the device indicated by the device allocation table to a virtual address space of the OS being the accessing party, and when the access to the device is an access to a PCI (Peripheral Components Interconnect bus) configuration register received from the OS being the accessing party, the processing circuitry intercepts the access to the PCI configuration register and accesses the PCI configuration register of the device instead of allowing the access to be performed by the OS being the accessing party.

2. The computing machine according to claim 1, wherein the processing circuitry, when an access to the PCI configuration register of the device occurs, determines the OS to which the device is allocated, based on the device allocation table, when the device is allocated to the OS being the accessing party, allows the access, and when the device is not allocated to the OS being the accessing party, denies the access.

3. The computing machine according to claim 2, wherein when the access to the PCI configuration register is a change of a base address and the device is allocated to the OS being the accessing party, processing circuitry updates information of the physical address space of the device in the device allocation table, based on a changed base address, and maps the physical address space of the device indicated by updated information to the virtual address space of the OS being the accessing party.

4. The computing machine according to claim 3, wherein the processing circuitry, when an access to write to a PCI configuration register of a device of a predetermined type occurs, denies the access to write, and when an access to read to the PCI configuration register of the device of the predetermined type occurs, allows the access to read.

5. The computing machine according to claim 4, wherein when an access to write to the PCI configuration register of the device of the predetermined type occurs from a predetermined management OS other than the plurality of OSs, the processing circuitry allows the access to write.

6. The computing machine according to claim 1, wherein the processing circuitry stores the device allocation table as a stored allocation table when operation is finished, and generates a new device allocation table by using the stored allocation table when operation is started.

7. An access management method that is executed by a computing machine, where a plurality of OSs (Operating Systems) each operate and are configured to access a device, wherein the computing machine includes a memory to store a device allocation table to allocate the device to one of the plurality of OSs, in order of occurrence of access, and processing circuitry, the method comprising:

when an access to the device occurs, determining to which OS of the plurality of OSs the device is allocated, based on the device allocation table, by the processing circuitry;

when the device is not allocated to any OS, updating the device allocation table in order to allocate the device to an OS being an accessing party and allowing the access to the device by the processing circuitry; and when the device is allocated to an OS other than the OS being the accessing party, denying the access to the device by the processing circuitry, wherein the device allocation table is data correspondingly indicating a physical address space of the device and the OS to which the device is allocated, and when the device is not allocated to any OS, the processing circuitry further maps all of the physical address space of the device indicated by the device allocation table to a virtual address space of the OS being the accessing party, and when the access to the device is an access to a PCI (Peripheral Components Interconnect bus) configuration register received from the OS being the accessing party, the processing circuitry intercepts the access to the PCI configuration register and accesses the PCI configuration register of the device instead of allowing the access to be performed by the OS being the accessing party.

8. A non-transitory computer readable medium that stores an access management program, which uses a device allocation table, to cause a computer to implement access management processing, wherein the device allocation table is a table to allocate a device to one of a plurality of OSs (Operating Systems) that each access the device, in order of occurrence of access, and the access management processing comprising:

when an access to the device occurs, determining to which OS of the plurality of OSs the device is allocated, based on the device allocation table;

when the device is not allocated to any OS, updating the device allocation table in order to allocate the device to an OS being an accessing party and allowing the access to the device; and when the device is allocated to an OS other than the OS being the accessing party, denying the access to the device, wherein the device allocation table is data correspondingly indicating a physical address space of the device and the OS to which the device is allocated, and when the device is not allocated to any OS, further mapping all of the physical address space of the device indicated by the device allocation table to a virtual address space of the OS being the accessing party, and when the access to the device is an access to a PCI (Peripheral Components Interconnect bus) configuration register received from the OS being the accessing party, the method includes intercepting the access to the PCI configuration register and accessing the PCI configuration register of the device instead of allowing the access to be performed by the OS being the accessing party.

* * * * *

UNITED STATES PATENT AND TRADEMARK OFFICE
CERTIFICATE OF CORRECTION

PATENT NO. : 9,558,364 B2
APPLICATION NO. : 14/371891
DATED : January 31, 2017
INVENTOR(S) : Ryo Okabe It is certified that error appears in the above-identified patent and that said Letters Patent is hereby corrected as shown below:

On the Title Page

Column 2, after "OTHER PUBLICATIONS," insert the following:
--International Search Report Issued May 22, 2012 in PCT/JP12/054427 Filed February 23, 2012--.

Signed and Sealed this
Third Day of April, 2018

Andrei Iancu
*Director of the United States Patent and Trademark Office*